United States Patent
Boddapati

(10) Patent No.: US 10,543,528 B2
(45) Date of Patent: Jan. 28, 2020

(54) WEAR RESISTANT MATERIAL AND SYSTEM AND METHOD OF CREATING A WEAR RESISTANT MATERIAL

(71) Applicant: ESCO Corporation, Portland, OR (US)

(72) Inventor: Srinivasarao Boddapati, Bothell, WA (US)

(73) Assignee: ESCO GROUP LLC, Portland, OR (US)

( * ) Notice: Subject to any disclaimer, the term of this patent is extended or adjusted under 35 U.S.C. 154(b) by 226 days.

(21) Appl. No.: 13/752,521

(22) Filed: Jan. 29, 2013

(65) Prior Publication Data

US 2013/0196169 A1 Aug. 1, 2013

Related U.S. Application Data

(60) Provisional application No. 61/593,091, filed on Jan. 31, 2012.

(51) Int. Cl.

| | |
|---|---|
| *B22D 19/00* | (2006.01) |
| *B32B 3/26* | (2006.01) |
| *B32B 5/16* | (2006.01) |
| *B32B 3/28* | (2006.01) |
| *B32B 7/04* | (2019.01) |

(Continued)

(52) U.S. Cl.
CPC ............ *B22D 19/00* (2013.01); *B22D 23/06* (2013.01); *B32B 3/26* (2013.01); *B32B 3/28* (2013.01); *B32B 5/16* (2013.01); *B32B 7/02* (2013.01); *B32B 7/04* (2013.01); *B32B 15/01* (2013.01); *Y10T 428/12042* (2015.01); *Y10T 428/12389* (2015.01); *Y10T 428/12403* (2015.01); *Y10T 428/12479* (2015.01); *Y10T 428/2495* (2015.01); *Y10T 428/24537* (2015.01);
(Continued)

(58) Field of Classification Search
None
See application file for complete search history.

(56) References Cited

U.S. PATENT DOCUMENTS

| | | |
|---|---|---|
| 1,939,991 A | 12/1933 | Kruselim |
| 1,978,319 A | 10/1934 | Mowery |

(Continued)

FOREIGN PATENT DOCUMENTS

| | | |
|---|---|---|
| AU | 2012240099 | 10/2012 |
| CN | 1539047 | 10/2004 |

(Continued)

OTHER PUBLICATIONS

English machine translation of DE1921568 dated May 27, 2017.*

(Continued)

*Primary Examiner* — Adam Krupicka
(74) *Attorney, Agent, or Firm* — John Anderton

(57) ABSTRACT

A system and method of forming a wear resistant composite material includes placing a porous wear resistant filler material in a mold cavity and infiltrating the filler material with a matrix material by heating to a temperature sufficient to melt the matrix material, then cooling the assembly to form a wear resistant composite material. The system and method can be used to form the wear resistant composite material on the surface of a substrate, such as a part for excavating equipment or other mechanical part. One suitable matrix material may be any of a variety of ductile iron alloys.

14 Claims, 11 Drawing Sheets

(51) Int. Cl.
  *B32B 7/02* (2019.01)
  *B32B 15/01* (2006.01)
  *B22D 23/06* (2006.01)

(52) U.S. Cl.
  CPC .......... *Y10T 428/24545* (2015.01); *Y10T 428/24997* (2015.04)

(56) References Cited

U.S. PATENT DOCUMENTS

| | | | |
|---|---|---|---|
| 2,130,684 | A | 9/1938 | Hintermeyer |
| 2,260,593 | A | 10/1941 | Wittlinger et al. |
| 2,363,272 | A | 11/1944 | Taeyaerts et al. |
| 2,603,985 | A | 7/1952 | Vidmar |
| 2,714,245 | A * | 8/1955 | Goetzel .......... 416/241 B |
| 2,731,711 | A | 1/1956 | Lucas |
| 2,833,638 | A * | 5/1958 | Owen .......... B23P 5/00 164/97 |
| 3,149,411 | A | 9/1964 | Smiley et al. |
| 3,168,767 | A | 2/1965 | Lutz |
| 3,175,260 | A | 3/1965 | Bridwell et al. |
| 3,258,817 | A | 7/1966 | Smiley |
| 3,608,170 | A * | 9/1971 | Larson et al. .......... 29/898.055 |
| 3,777,517 | A | 12/1973 | Shwayder et al. |
| 3,790,353 | A | 2/1974 | Jackson et al. |
| 3,882,594 | A | 5/1975 | Jackson et al. |
| 3,889,093 | A | 6/1975 | Fawcett et al. |
| 3,894,575 | A | 7/1975 | Baum |
| 3,932,952 | A | 1/1976 | Helton et al. |
| 3,955,855 | A | 5/1976 | Massieson et al. |
| 3,972,570 | A | 8/1976 | Massieon |
| 3,977,227 | A | 8/1976 | Noble |
| 4,013,453 | A | 3/1977 | Patel |
| 4,017,480 | A | 4/1977 | Baum |
| 4,024,902 | A | 5/1977 | Baum |
| 4,052,802 | A | 10/1977 | Moen et al. |
| 4,096,002 | A | 6/1978 | Ikawa et al. |
| 4,119,459 | A | 10/1978 | Ekemar et al. |
| 4,136,230 | A | 1/1979 | Patel |
| 4,156,374 | A | 5/1979 | Shwayder |
| 4,187,626 | A | 2/1980 | Greer et al. |
| 4,274,769 | A | 6/1981 | Multakh |
| 4,327,156 | A | 4/1982 | Dillon et al. |
| 4,363,661 | A * | 12/1982 | Kovacs .......... C21C 1/10 148/322 |
| 4,450,019 | A * | 5/1984 | Satou et al. .......... 420/27 |
| 4,452,325 | A | 6/1984 | Radd et al. |
| 4,499,795 | A | 2/1985 | Radtke |
| 4,526,220 | A | 7/1985 | Scherer |
| 4,529,042 | A | 7/1985 | Wetmore |
| 4,605,157 | A | 8/1986 | Barr et al. |
| 4,608,318 | A | 8/1986 | Makrides et al. |
| 4,638,847 | A | 1/1987 | Day |
| 4,676,124 | A | 6/1987 | Fischer |
| 4,705,123 | A | 11/1987 | Dennis |
| 4,719,076 | A | 1/1988 | Geczy et al. |
| 4,743,137 | A | 5/1988 | Bucher et al. |
| 4,884,477 | A | 12/1989 | Smith et al. |
| 4,916,869 | A | 4/1990 | Oliver |
| 4,923,665 | A | 5/1990 | Andersen et al. |
| 4,933,240 | A | 6/1990 | Barber, Jr. |
| 4,938,991 | A | 7/1990 | Bird |
| 4,944,559 | A | 7/1990 | Sionnet et al. |
| 4,949,598 | A | 8/1990 | Griffin |
| 5,027,878 | A | 7/1991 | Revankar et al. |
| 5,030,519 | A | 7/1991 | Scruggs et al. |
| 5,066,546 | A | 11/1991 | Materkowski |
| 5,090,491 | A | 2/1992 | Tibbitts et al. |
| 5,111,600 | A | 5/1992 | Lukavich et al. |
| 5,113,924 | A | 5/1992 | Green et al. |
| 5,178,647 | A * | 1/1993 | Komatsu et al. .......... 51/307 |
| 5,190,092 | A | 3/1993 | Revankar |
| 5,271,547 | A | 12/1993 | Carlson |
| 5,299,620 | A | 4/1994 | Revankar et al. |
| 5,316,851 | A | 5/1994 | Brun et al. |
| 5,337,801 | A | 8/1994 | Materkowski |
| 5,355,750 | A | 10/1994 | Scott et al. |
| 5,373,907 | A | 12/1994 | Weaver |
| 5,375,350 | A | 12/1994 | Maybon |
| 5,375,759 | A | 12/1994 | Hiraishi et al. |
| 5,441,121 | A | 8/1995 | Tibbitts |
| 5,445,231 | A * | 8/1995 | Scott .......... E21B 10/50 175/374 |
| 5,502,905 | A | 4/1996 | Cornelius et al. |
| 5,589,268 | A | 12/1996 | Kelley et al. |
| 5,733,649 | A | 3/1998 | Kelley et al. |
| 5,737,980 | A | 4/1998 | Keith et al. |
| 5,746,281 | A | 5/1998 | Huikkonen |
| RE35,812 | E | 6/1998 | Oliver |
| 5,765,624 | A | 6/1998 | Hathaway et al. |
| 5,837,069 | A | 11/1998 | Deards et al. |
| 5,880,382 | A | 3/1999 | Fang et al. |
| 6,024,804 | A | 2/2000 | Ferra et al. |
| 6,033,791 | A | 3/2000 | Smith et al. |
| 6,039,641 | A | 3/2000 | Sung |
| 6,073,518 | A | 6/2000 | Chow et al. |
| 6,089,123 | A | 7/2000 | Chow et al. |
| 6,220,117 | B1 | 4/2001 | Butcher |
| 6,258,180 | B1 | 7/2001 | Wilde et al. |
| 6,347,676 | B1 * | 2/2002 | Vuyk, Jr. .......... E21B 10/16 175/331 |
| 6,470,558 | B1 | 10/2002 | Russell et al. |
| 6,571,493 | B2 | 6/2003 | Amano et al. |
| 6,592,304 | B1 | 7/2003 | Kammerer |
| 6,601,789 | B1 | 8/2003 | Bajadali et al. |
| 6,649,682 | B1 * | 11/2003 | Breton .......... B05D 5/02 524/404 |
| 6,719,948 | B2 | 4/2004 | Lorenz et al. |
| 6,735,890 | B2 | 5/2004 | Carpenter et al. |
| 6,984,454 | B2 | 1/2006 | Majagi |
| 7,017,677 | B2 | 3/2006 | Keshavan et al. |
| 7,261,752 | B2 | 8/2007 | Sung |
| 7,445,294 | B2 | 11/2008 | Hall et al. |
| 7,510,032 | B2 | 3/2009 | Kirk et al. |
| 7,510,034 | B2 | 3/2009 | Curry et al. |
| 7,513,295 | B2 | 4/2009 | Poncin et al. |
| 7,523,794 | B2 | 4/2009 | Hall et al. |
| 7,568,770 | B2 | 8/2009 | Hall et al. |
| 7,597,159 | B2 | 10/2009 | Overstreet |
| 7,673,785 | B2 | 3/2010 | Weaver |
| 7,824,605 | B2 | 11/2010 | Lemke et al. |
| 7,846,381 | B2 | 12/2010 | Braga |
| 7,867,427 | B2 | 1/2011 | Chrystal et al. |
| 8,800,848 | B2 | 8/2014 | Mirchandani et al. |
| 2003/0213861 | A1 | 11/2003 | Condon et al. |
| 2004/0060742 | A1 * | 4/2004 | Kembaiyan et al. .......... 175/434 |
| 2006/0165973 | A1 | 7/2006 | Dumm et al. |
| 2008/0029310 | A1 | 2/2008 | Stevens et al. |
| 2008/0145645 | A1 | 6/2008 | Lemke |
| 2008/0223575 | A1 | 9/2008 | Oldman et al. |
| 2009/0047543 | A1 | 2/2009 | Garber et al. |
| 2010/0044114 | A1 | 2/2010 | Mirchandani et al. |
| 2010/0101866 | A1 | 4/2010 | Bird |
| 2010/0143742 | A1 | 6/2010 | Tsypine et al. |
| 2010/0170121 | A1 | 7/2010 | Vanderpoorten et al. |
| 2010/0181116 | A1 | 7/2010 | Stauffer |
| 2010/0187018 | A1 | 7/2010 | Choe et al. |
| 2010/0189891 | A1 | 7/2010 | Usherenko |
| 2010/0224418 | A1 | 9/2010 | Eason et al. |
| 2010/0230173 | A1 | 9/2010 | Xia et al. |
| 2010/0275473 | A1 | 11/2010 | Maher |
| 2010/0278604 | A1 | 11/2010 | Glass et al. |
| 2010/0296961 | A1 | 11/2010 | DeBruin |
| 2012/0258273 | A1 * | 10/2012 | Churchill .......... B23K 1/00 428/68 |

FOREIGN PATENT DOCUMENTS

| | | |
|---|---|---|
| CN | 102274946 | 12/2011 |
| DE | 1921568 | 1/1970 |
| DE | 1921568 A1 * | 1/1970 .......... B22F 7/06 |
| GB | 2041427 | 9/1980 |
| JP | 52-009635 | 1/1977 |

(56) References Cited

FOREIGN PATENT DOCUMENTS

| | | |
|---|---|---|
| JP | 57-88966 | 6/1982 |
| JP | 57-171563 | 10/1982 |
| JP | 61-190353 | 11/1986 |
| JP | 6-240710 | 8/1994 |
| JP | 2001-248127 | 9/2001 |
| JP | 2005-273439 | 10/2005 |
| JP | 2008-246550 | 10/2008 |
| RU | 2220851 | 5/2003 |
| RU | 2228409 | 5/2004 |
| UA | 15945 | 6/1997 |
| WO | WO 2002/13996 | 2/2002 |
| WO | WO 2003/004782 | 1/2003 |
| WO | WO 2007/059568 | 5/2007 |
| WO | WO 2009/155655 | 12/2009 |
| WO | WO 2010/021802 | 2/2010 |

OTHER PUBLICATIONS

Huggett, Paul, "Production and Analysis of Alloy Composites Exhibiting Improved Bonding Using a Novel Vacuum Casting Process", University of Technology Sydney, pp. 331, (2008).

Hewett, Catherine, "[2nd] Declaration in the matter of Australian Patent Application 2012240099 in the name of ESCO Corporation and Opposition thereto", pp. 38., May 12, 2015.

Hewett, Catherine, "[1st] Declaration in the matter of Australian Patent Application 2012240099 in the name of ESCO Corporation and Opposition thereto", pp. 18, Apr. 16, 2015.

Ductile Iron Society, "Ductile Iron Data for Design Engineers (Section V)—Alloy ductile irons", pp. 1-18, Jan. 1990, http://www.ductile.org/didata/pdf/data5.pdf.

Robert Covert, et al., Nickel Institute, "Properties and Applications of Ni-Resist and Ductile Ni-Resist Alloys", pp. 1-40, (1998); https://wwvv.nickelinstitute.org/~/Media/File.

Amended Statement of Opposition submitted by Caterpillar Inc. in the matter of Australian Patent Application 2012240099 in the name of ESCO Corporation and Opposition thereto.

Anderson, Rory "Declaration in the matter of Australian Patent Application 2012240099 in the name of ESCO Corporation and Opposition thereto", pp. 34, Oct. 14, 2015.

Hewett, Catherine, "[3rd] Declaration in the matter of Australian Patent Application 2012240099 in the name of ESCO Corporation and Opposition thereto", pp. 22, Oct. 9, 2015.

Huggett, Paul, "[1st] Declaration in the matter of Australian Patent Application 2012240099 in the name of ESCO Corporation and Opposition thereto", pp. 1-9, Aug. 4, 2015.

Huggett, Paul, "[2nd] Declaration in the matter of Australian Patent Application 2012240099 in the name of ESCO Corporation and Opposition thereto", pp. 1-9, Aug. 11, 2015.

Huggett, Paul, "[3rd] Declaration in the matter of Australian Patent Application 2012240099 in the name of ESCO Corporation and Opposition thereto", pp. 1-4, Aug. 13, 2015.

"Patent Applicants Outline of Submissions in the matter of Australian Patent Application 2012240099 in the name of ESCO Corporation and Opposition thereto", pp. 29, Mar. 4, 2.

"Patent Applicants Supplementary Submissions in the matter of Australian Patent Application 2012240099 in the name of ESCO Corporation and Opposition thereto", pp. 29, Mar. 1.

Dcirovi, "Filler metal", Mar. 12, 2011, Wikipedia—the Free Encyclopedia available at: https://en.wikipedia.org/w/index.php?title=Filler_metal&oldid=418532176.

"Decision by Australian Patent Office", in the matter of Australian Patent Application 2012240099 in the name of ESCO Corporation and Opposition thereto, pp. 31, May 23, 2016.

Klaus Rohrig, "Austenitische Gusseisen," pp. 2-33, XP055376679, Jan. 1, 2014.

* cited by examiner

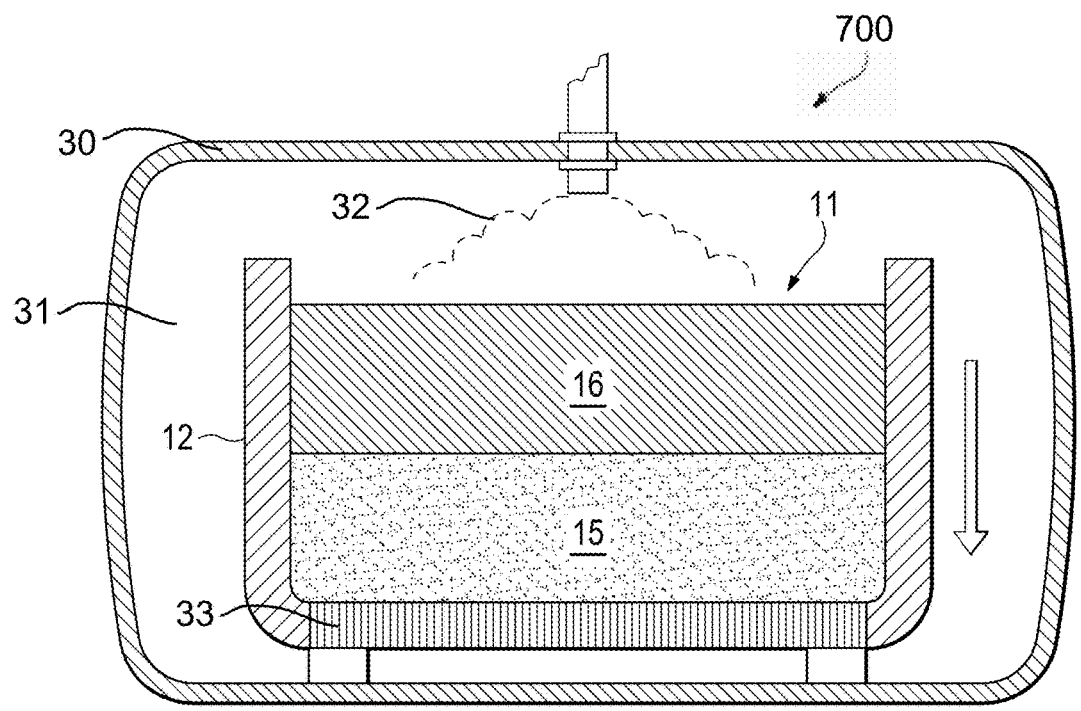
FIG. 16
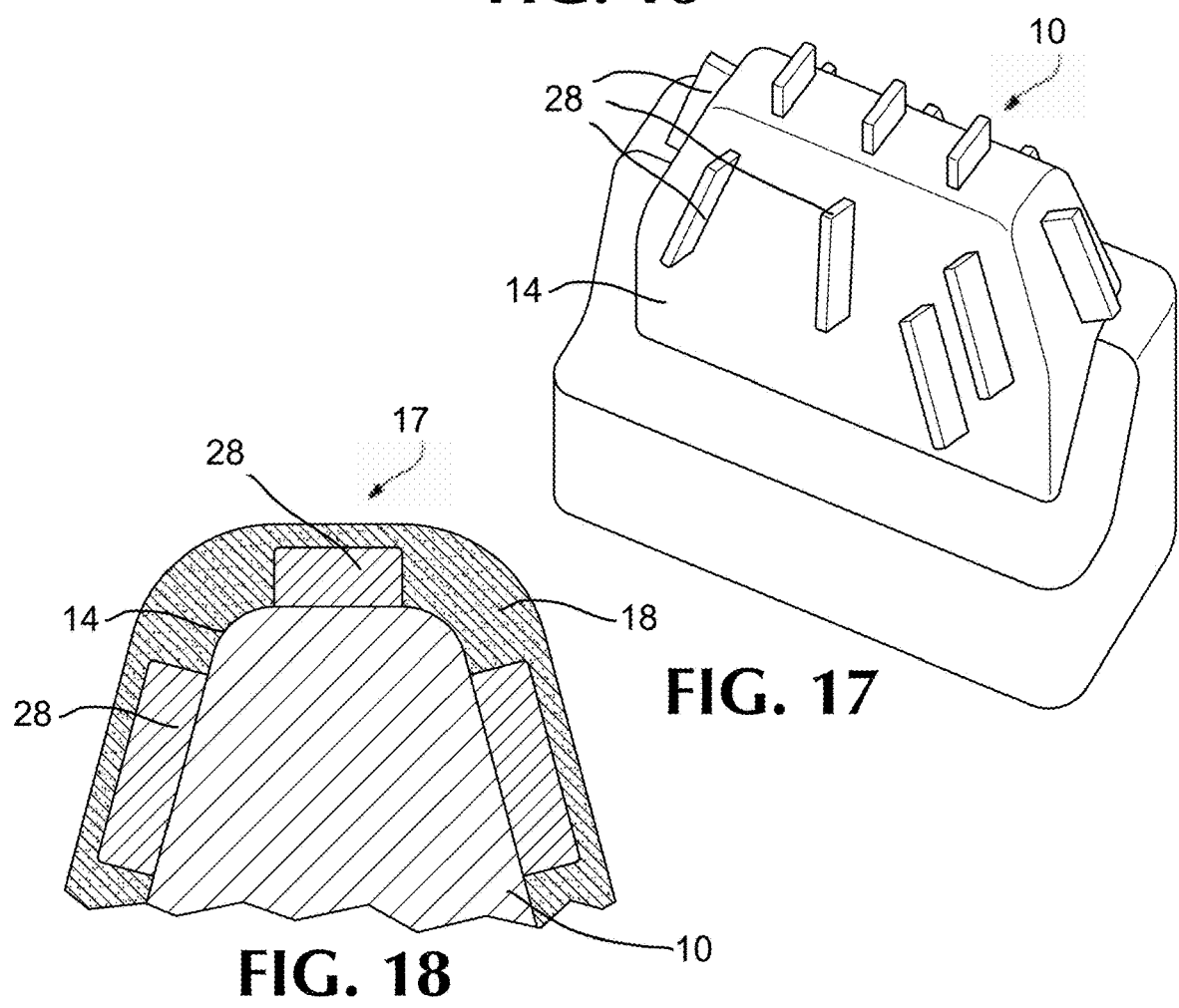
FIG. 17
FIG. 18

WEAR RESISTANT MATERIAL AND SYSTEM AND METHOD OF CREATING A WEAR RESISTANT MATERIAL

CROSS-REFERENCE TO RELATED APPLICATIONS

The present application claims priority to and the benefit of U.S. Provisional Application No. 61/593,091, filed Jan. 31, 2012, which application is incorporated by reference herein in its entirety and made part hereof.

TECHNICAL FIELD

The present invention generally relates to systems and methods for creating a wear resistant material, and more specifically, to systems and methods that utilize infiltration techniques to form the wear resistant material and connect the material to a substrate by brazing, as well as a product of the system and method.

BACKGROUND

Various types of excavating equipment have points, edges, surfaces, and other parts that are subjected to repeated impacts and stresses, which may result in wearing or fracture of such parts. Accordingly, materials having high hardness and wear resistance coupled with good toughness are desirable for such applications. Materials with high hardness and wear resistance may be useful in other applications as well, including applications where similar challenges are faced.

One common technique for producing wear resistant parts is casting the part by pouring a molten metal (e.g. cast iron) around a hard, wear resistant material placed in the mold to attach the wear resistant material to the cast metal part and create a wear resistant composite. A major drawback of this method is that the substrate onto which the wear resistant material is attached by this method is limited to the materials that are suitable for casting. Additionally, the wear resistant material is generally limited to volume fraction ranges of 5-50% and limited to particles greater than 50 μm, and the parts are generally limited to thicknesses less than 6.25 mm (0.250 inch). Further, this method requires superheating the molten alloy to about 200° C. to 400° C., which leads to significant dissolution of carbide particles and thereby degrades the properties of the resultant composite. Still further, because such casting is done in air, there is a possibility for oxidation of both hard particles and the matrix metal, and oxides may become entrapped in the composite and degrade the wear and mechanical performance.

Another common technique for producing wear resistant parts is the infiltration of nickel based alloys, copper based alloys, and/or cast iron into a porous mass of both pure tungsten carbide and cemented carbide particles. However, nickel and copper based alloys are expensive, and cast iron does not have toughness that is satisfactory for all applications. Ductile iron represents a much more economical material that is castable and has good fracture toughness. However, the conditions employed for these techniques are not suitable for ductile iron infiltration. In addition, the infiltration temperatures involved in these techniques are so high that significant degradation of hard particles takes place. In the case of infiltration of cast iron into spherical cast carbides using these techniques, the original carbide particles may completely disintegrate. As a result of metallurgical interaction between the molten binder metals with hard carbide particles, the particle size for such techniques must typically be kept above 1.14 mm (0.045 inch), so that even after reaction there is still comparatively significant fraction of hard particle left to provide wear resistance.

Accordingly, while certain existing products and methods provide a number of advantageous features, they nevertheless have certain limitations. The present invention seeks to overcome certain of these limitations and other drawbacks of the prior art, and to provide new features not heretofore available.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of the present invention relate to a method for use in forming a wear resistant composite coating on a substrate. A mold is positioned proximate a surface of the substrate, such that the surface is in communication with a cavity of the mold, and a porous wear resistant material is placed within the cavity, in close proximity to the surface. A metallic matrix material is then placed in communication with the cavity, and the mold and the matrix material are heated to a temperature above a melting point of the matrix material. The temperature is held above the melting point for a time sufficient for the matrix material to infiltrate the wear resistant material in molten form and contact the surface of the substrate. Thereafter, the mold and the matrix material are cooled to solidify the matrix material and form a wear resistant composite coating that includes the wear resistant material embedded within the matrix material on the surface of the substrate. The matrix material may be ductile iron in one embodiment, and the ductile iron may have a composition that includes, in weight percent, approximately 3.0-4.0% carbon, approximately 1.8-2.8% silicon, approximately 0.1-1.0% manganese, approximately 0.01-0.03% sulfur, and approximately 0.01-0.1% phosphorous, with the balance being iron and incidental elements and impurities. It is understood that other elements and additions may be included in the ductile iron, such as nickel (up to 37 wt. %), chromium (up to 5.5 wt. %), and/or silicon (up to 5.5 wt. %).

According to one aspect, the wear resistant material may include one or more materials selected from the group consisting of: carbides, nitrides, borides, silicides, intermetallic compounds of transition metals, and combinations thereof. Examples of carbides that may be used include: WC, TiC, SiC, $Cr_3C_2$, VC, ZrC, NbC, TaC, (W,Ti)C, $B_4C$, and $Mo_2C$, and combinations thereof. Examples of nitrides that may be used include: TiN, BN, $Si_3N_4$, ZrN, VN, TaN, NbN, HfN, CrN, MoN, and WN, and combinations thereof. Examples of borides that may be used include: titanium boride, chromium boride, tungsten boride, nickel boride, zirconium boride, hafnium boride, tantalum boride, niobium boride, vanadium boride, molybdenum boride, silicon boride, aluminum boride, and other borides of transition metals, and combinations thereof. Examples of silicides that may be used include silicides of transition metals. The wear resistant material may further have a wetting compatible coating.

According to another aspect, the composite coating may be formed on a plurality of surfaces of the substrate, or may be formed on only a portion of the surface of the substrate.

According to a further aspect, the porous wear resistant material may be in the form of a loose particulate material or in the form of a porous preform formed of a particulate material bonded together to form the porous preform. The particulate material in the preform may be bonded together in several different ways, such as by sintering or by a polymer material. If a polymer material is used for bonding, the material may be selected so that the brazing temperature is sufficient to remove the polymer material from the particulate material during heating.

According to yet another aspect, the mold may be or include a sheet metal shell connected to the substrate to define the cavity. The shell may have an opening to an exterior of the shell, and the porous wear resistant material may be placed within the cavity by insertion through the opening. Such a shell may have a wall thickness significantly lower than the thickness of the substrate, and may be welded to the outer surface of the substrate.

According to a still further aspect, the heating is performed within a furnace chamber, and the chamber may be evacuated (e.g. 0.0001 or 0.001 Torr to 0.010 Torr, or even lower pressure) prior to the temperature reaching the melting point of the matrix material. An inert gas may be introduced into the chamber after the matrix material has melted. Alternately, the melting may be performed in the presence of an inert gas, such as by introducing argon gas into the chamber before the matrix material has melted. In this embodiment, the mold has a permeable portion in contact with the porous wear resistant material to permit residual gas to escape from the permeable portion during infiltration.

According to an additional aspect, the matrix material may be positioned at least partially laterally or horizontally to the wear resistant material, and the method may further include placing a displacement medium (e.g. a flowable medium such as ceramic beads) adjacent to the matrix material and opposite the wear resistant material. The displacement medium supports the molten matrix material and displaces the molten matrix material as the molten matrix material infiltrates the wear resistant material. A barrier may further be placed between the displacement medium and the matrix material, to resist permeation of the molten matrix material into the displacement medium. One example of lateral infiltration is when the substrate is a tubular structure, such that the molten matrix material infiltrates laterally outward to form the composite coating on the inner surface of the tubular structure. In this configuration, the displacement medium is placed at a center of the tubular structure and displaces outwardly as the molten matrix material infiltrates the wear resistant material.

Additional aspects of the invention relate to a system for use in forming a wear resistant composite coating on a surface of a substrate. The system may include a mold positioned in proximity to the surface of the substrate, such that the surface is in communication with the mold cavity, a porous wear resistant material within the cavity, in close proximity to the surface, and a metallic matrix material in communication with the cavity. The system may be usable in connection with a method according to the aspects described above, such as heating the mold and the matrix material to a temperature above a melting point of the matrix material and holding the temperature for a time sufficient for the matrix material to infiltrate the wear resistant material in molten form and contact the surface of the substrate, and then cooling the mold and the matrix material to solidify the matrix material and form a wear resistant composite coating on the surface of the substrate. As described above, the matrix material may be ductile iron.

According to one aspect, the wear resistant material may include one or more materials selected from the group consisting of: carbides, nitrides, borides, silicides, intermetallic compounds of transition metals, and combinations thereof, including the materials described above.

According to another aspect, the porous wear resistant material may be in the form of a loose particulate material or in the form of a porous preform formed of a particulate material bonded together to form the porous preform, as described above.

Further aspects of the invention relate to an article of manufacture, which may be manufactured according to a systems and/or a method according to the aspects described above or by other systems and/or methods. The article includes a metallic substrate having a surface with a wear resistant composite coating bonded to the surface. The wear resistant composite coating includes a wear resistant particulate material, as well as a metallic matrix material bonding together the wear resistant particulate material. The coating may be a continuous coating. The matrix material is further bonded to the surface of the substrate to bond the wear resistant composite coating to the substrate. The metallic matrix material may be ductile iron, which may have a composition as described above. The method may be used to make coatings having thicknesses of at least 0.005 inches, and typically greater than 0.040 inches. The method may achieve infiltration distances of up to 6 inches or more, or up to 7.5 inches or more in some embodiments, and may therefore be used to make coatings having a greater thickness than the substrate itself, such as up to 6 inches or more, up to 7.5 inches or more, or even greater thicknesses in various embodiments.

According to one aspect, the wear resistant material may include one or more materials selected from the group consisting of: carbides, nitrides, borides, silicides, intermetallic compounds of transition metals, and combinations thereof, including the examples described above.

According to another aspect, the substrate has a plurality of protrusions connected to the surface and extending outwardly from the surface. The protrusions are embedded within the wear resistant composite coating. As one example, the protrusions may be a plurality of rib or plate members symmetrically distributed on the outer surface of the substrate.

According to a further aspect, the article may be a wear member for excavating, mining, or other earthmoving equipment, and the substrate may be formed by a working portion of the wear member, such that the composite coating overlays the working portion.

Other features and advantages of the invention will be apparent from the following description taken in conjunction with the attached drawings.

BRIEF DESCRIPTION OF THE DRAWINGS

To allow for a more full understanding of the present invention, it will now be described by way of example, with reference to the accompanying drawings in which:

FIG. 16 is a schematic illustration showing an example of a system and method for infiltration of a porous wear resistant material with a braze material in a furnace under partial Ar pressure, according to another embodiment of the present invention;

FIG. 17 is a perspective view of another embodiment of a substrate configured for use according to aspects of the present invention, in the form of a point for excavating or mining equipment;

FIG. 18 is a cross-sectional view of the substrate of FIG. 17, having a wear resistant composite material formed on an outer surface thereof;

DETAILED DESCRIPTION

Figure 1:
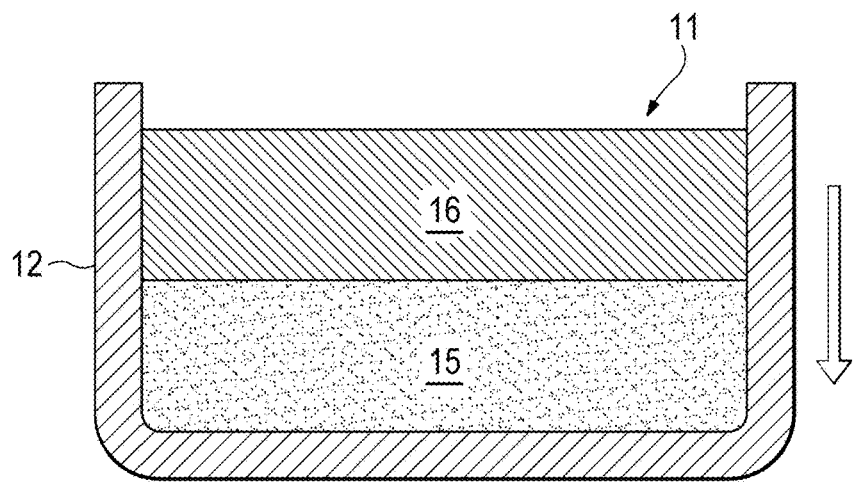
FIG. 1 is a schematic illustration showing an example of vertical infiltration from above to form a wear resistant composite material, according to one embodiment of the present invention.

While this invention is susceptible of embodiment in many different kilns, there are shown in the drawings, and will herein be described in detail, preferred embodiments of the invention with the understanding that the present disclosure is to be considered as an exemplification of the principles of the invention and is not intended to limit the broad aspects of the invention to the embodiments illustrated and described.

In general, aspects of the invention relate to systems and methods of forming a wear resistant composite material that include placing a porous wear resistant filler material in a mold cavity and infiltrating the filler material with a matrix material by heating to a temperature sufficient to melt the matrix material, then cooling the assembly to form a wear resistant composite material. The resultant composite material includes the matrix material intermixed with the filler material and bonded to the filler material, where the matrix material bonds the composite to the substrate and also may bond together the filler material. The system and method can be used to form the wear resistant composite material on the surface of a substrate, such as a part for mining, excavating, or other earthmoving equipment or other mechanical part. It is understood that the "surface" of a substrate as described herein may include a plurality of different surfaces, and does not imply any specific contour to such surface(s) unless explicitly noted. The substrate can be any material with a melting point that is suitable for the infiltration process, for example having a melting point that is higher than the matrix material. Examples of such substrates include cast, wrought, and powder metallurgy-produced metallic materials, as well as ceramics and ceramic-based materials such as metallized ceramics. In one embodiment, the substrate may be carbon steel, alloy steel, stainless steel, or tool steel. The system and method can alternately be used to form the wear resistant composite material as a unitary piece.

In one embodiment, the method utilizes ductile iron as the matrix material and produces a dense, hard, and tough composite with excellent wear resistance and toughness. Additionally, ductile iron has a melting point that is sufficiently low to enable melting without excess heating. All types/grades of ductile iron may be usable in accordance with the invention, including any ductile iron that is within the scope defined by ASTM standard A536-84 (Reapproved, 2004), which is incorporated by reference herein. In one embodiment, a ductile iron matrix material may have a composition, in weight percent, of approximately 3.0-4.0% carbon; approximately 1.8-2.8% silicon; approximately 0.1-1.0% manganese, approximately 0.01-0.03% sulfur, and approximately 0.01-0.1% phosphorous, with the balance being iron and incidental elements and impurities. As used herein, the term "approximately" designates a variance of +/−10% of the nominal values listed (e.g. the endpoints of the composition ranges). In another embodiment, the composition may not include this variance. In a further embodiment, the above composition may include further alloying additions, such as additions of Ni, Cr, and/or Si, to improve corrosion resistance, wear resistance, and/or high temperature properties of the matrix material. For example, Ni may be added in amounts of up to 37 wt. %, Cr may be added in amounts of up to 5.5 wt. %, and/or Si may be added in amounts up to about 5.5 wt. % in various embodiments. A ductile iron alloy may include still further alloying additions in other embodiments, including alloying additions that may increase performance. Ductile iron alloys with such alloying additions are known as high-alloy ductile irons and generally fall within the scopes of ASTM A439 and A571, which are also incorporated herein by reference. Such alloys may also be utilized in accordance with embodiments of the system and method described herein. In other embodiments, any alloying additions can be utilized to achieve different properties and/or microstructures, provided that they do not adversely affect the properties or microstructure in an excessive manner, such as increasing the infiltration temperature significantly and/or degrading the properties of the matrix or the resultant wear resistant material. The method may be utilized to create a composite with a metallic matrix material other than ductile iron, in an alternate embodiment.

The matrix material may be provided in a variety of forms. For example, in one embodiment, the matrix material may be provided in monolithic form, such as one or more blocks, billets, etc. In another embodiment, the matrix material may be provided in particulate form, such as powder, fibers, whiskers, etc. In a further embodiment, the matrix material may be provided in a porous form. The matrix material may be provided in a combination of such forms in additional embodiments.

Various hard and wear resistant materials may be used as the filler material in connection with different embodiments, including various carbides, nitrides, borides, and silicides, as well as other hard and wear resistant materials and mixtures of such materials, including other types of ceramic materials. Such materials may be provided in virgin form and/or with suitable coatings that provide wetting compatibility. For example, where the wear resistant material particles are not wetting-compatible with the matrix material, the wear resistant material particles may be coated with wetting-compatible coatings before they are used for forming the composite material by infiltration brazing. Carbides that may be used as the filler material include tungsten carbide (WC), TIC, SiC, $Cr_3C_2$, VC, ZrC, NbC, TaC, (W,Ti)C, $B_4C$, and $Mo_2C$, and other carbides. In one embodiment, spherical cast WC, crushed cast WC, and/or cemented WC is used as the filler material. Nitrides that may be used as the filler material include TiN, BN, $Si_3N_4$, ZrN, VN, TaN, NbN, HfN, CrN, MoN, WN, and other nitrides. Borides that may be used as the filler material include borides of transition metals such as titanium boride, chromium boride, tungsten boride, nickel boride, zirconium boride, hafnium boride, tantalum boride, niobium boride, vanadium boride, molybdenum boride, silicon boride, and aluminum boride, as well as other borides. Silicides that may be used as the filler material include silicides of transition metals. Other materials that may be used as filler materials include intermetallic compounds of transition metals. In one embodiment, the filler material may be selected based on the material having limited solubility in the molten braze material, in order to limit or prevent dissolution of the filler material in the braze material. As used herein, the terms "matrix material" and "filler material" should not be considered to imply that the matrix material or the filler material forms any specific proportion of the composite material. For example, the matrix material need not form a majority or a plurality of the composite material, and the filler material may form a majority or a plurality of the composite material in some embodiments.

The porous filler material may be provided in one or more different forms. In one embodiment, the porous filler material may be in the form of a loose particulate material, such as powder, fibers, whiskers, etc. The method may utilize a wide range of particle sizes in various embodiments, including particle sizes less than 50 µm or particle sizes less than 1 mm. In one embodiment, the particulate filler material may have a particle size that is greater than 0.1 µm. In another embodiment, the particulate filler material may have a particle size that is greater than 0.1 µm and up to 5 mm. In a further embodiment, the particulate filler material may have an average particle size of approximately 500 µm. In one embodiment, the filler material may be provided in multiple particle sizes, such as a combination of coarse and fine particles, which combination can be used to achieve greater density and/or volume fraction of the filler material. At any given volume fraction of filler material, such use of fine particles generally leads to finer pore sizes and can increase the yield strength of the matrix material that fills these pores, thereby increasing the overall wear resistance of the material. When the particulate material is placed in a mold cavity, the spaces between the particles form a porous structure that may be infiltrated by the matrix material. In another embodiment, the porous filler material may be in the form of a porous preform. The porosity of the porous preform can range from 5% to 95% in one embodiment. For example, the porous preform may include a particulate material that is bonded together by a binder material, such as a polymer binder. A preform may be attached to the substrate material, such as by an adhesive that will volatilize during the infiltration process. Upon infiltration, the molten matrix material has sufficient temperature to remove the binder material (such as by melting, volatilization, etc.) so that the matrix material can fill the pores left by the removal of the binder in addition to the pores between the particles. As another example, the porous preform may include a particulate material that is bonded together by sintering so that pores exist between the particles. In one embodiment, a pre-sintered preform may have a pore size that is on the order of the particle size, since the part may be sintered slightly to achieve neck growth between particles and provide some mechanical handling strength. Other porous materials may be used as well, such as woven fiber mats or fabrics. In a further embodiment, the porous filler material may be provided in a combination of different forms. For example, in one embodiment, the filler material may include one or more preforms forming a portion of the filler material, with other portions being formed by a particulate material (e.g. loose powder, fibers, whiskers, etc.) and/or woven fiber mats or fabrics.

Figure 2:
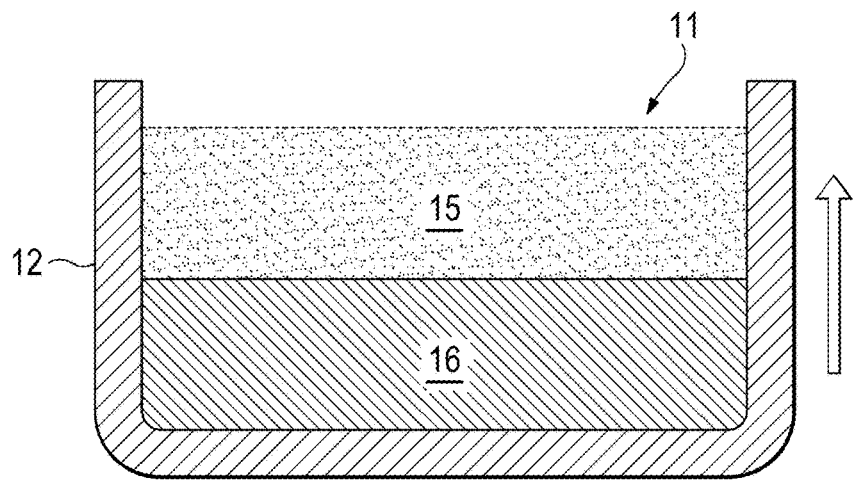
FIG. 2 is a schematic illustration showing an example of vertical infiltration from below to form a wear resistant composite material, according to one embodiment of the present invention.
Figure 3:
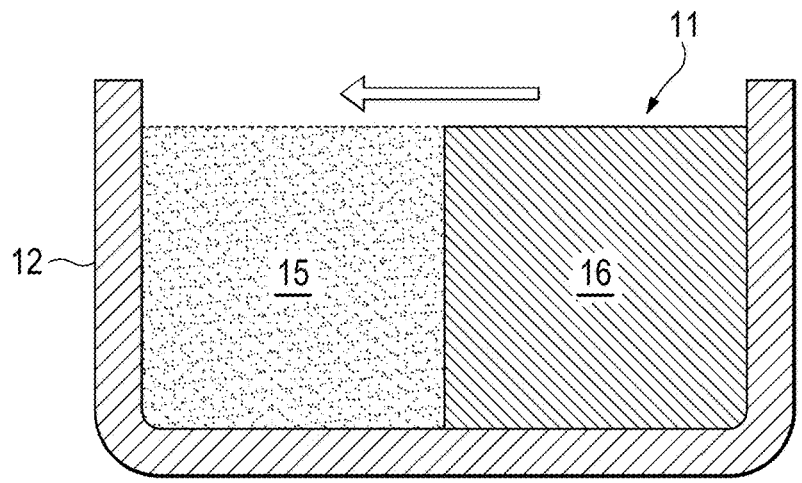
FIG. 3 is a schematic illustration showing an example of horizontal infiltration to form a wear resistant composite material, according to one embodiment of the present invention.
Figure 6:
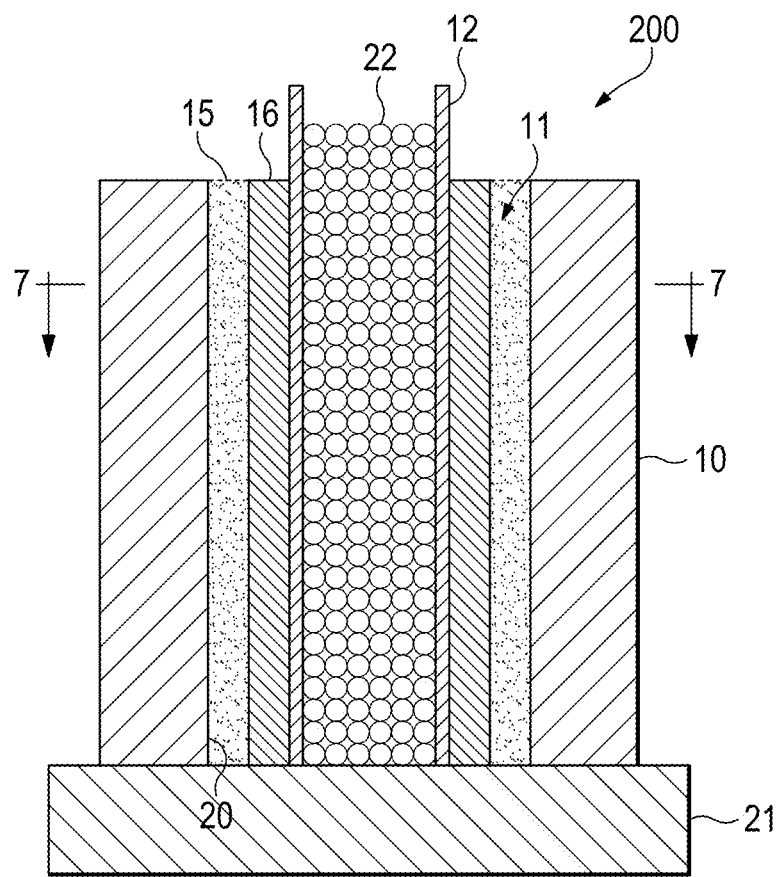
FIG. 6 is a schematic illustration showing another embodiment of a system and method of forming a wear resistant composite material on a substrate using outward infiltration, prior to infiltration, according to aspects of the present invention.
Figure 7:
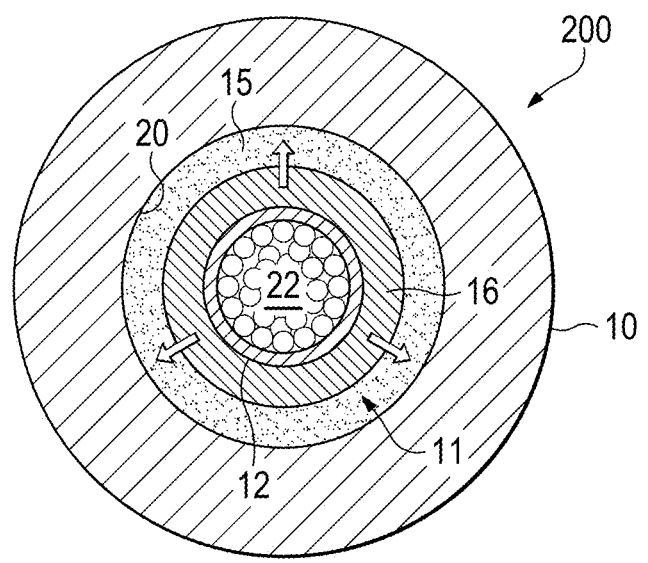
FIG. 7 is a schematic illustration showing a cross-section of the system as shown in FIG. 6.

The brazing operation by infiltration of the filler material by the matrix material may generally be accomplished by heating the matrix material to above its melting point while it is in contact or otherwise in communication with the filler material, to allow the molten matrix material to contact the filler material and infiltrate the porous filler material. The filler material is generally placed in contact or otherwise in communication with the substrate during infiltration, in order for the matrix material to contact the substrate material during infiltration to connect the resultant composite material to the substrate. Various molds may be utilized in connection with infiltration, as described below. FIGS. 1-3 illustrate various infiltration configurations according to various embodiments, each schematically illustrating a molten matrix material 16 infiltrating a filler material 15 in a cavity 11 of a mold 12. FIG. 1 illustrates downward vertical infiltration, in which gravity assists the infiltration. However, because the infiltration is mainly driven by capillary action, horizontal infiltration, upward vertical infiltration, outward/radial infiltration, and other infiltration configurations which may not utilize gravity or may work against gravity. FIG. 2 illustrates an example of upward vertical infiltration, and FIG. 3 illustrates an example of horizontal infiltration. FIGS. 6-7, discussed in greater detail below, illustrate an example of outward or radial infiltration, which may be considered another example of horizontal infiltration. In any non-downward infiltration embodiments, a technique may be utilized to displace molten matrix material 16 that has infiltrated the filler material 15, in order to keep the molten matrix material 16 in contact with the filler material 15 until infiltration is complete. For example, the mold 12 may be moved during infiltration to keep the matrix material 16, the filler material 15, and the substrate in proper contact/communication. As another example, a ram or other pressure mechanism may be used to ensure that the matrix material 15 is always in contact with the filler material during infiltration. In a further example, a movable material such as ceramic beads, may be used to displace the infiltrated matrix material, as described below and shown in FIGS. 6-9.

In one embodiment, the matrix or braze material is superheated 25° C. to 75° C. greater than the melting point, which is significantly lower than the superheating typically required for casting. In one example embodiment, where a ductile iron material is used as the matrix material, the infiltration can be conducted at a temperature range of 2150° F. to 2275° F., or a temperature of 2175° F. in another embodiment. The holding time period for the infiltration may be from 1 to 60 minutes in one embodiment, with greater infiltration lengths generally utilizing longer infiltration times. The infiltration may be conducted in an inert atmosphere in one embodiment, such as an argon (Ar) atmosphere, which can avoid volatilization-induced molten metal splatter at temperatures above the melting point. In one embodiment, the argon pressure during infiltration may be approximately $6.5 \times 10^{-5}$ atm to $4 \times 10^{-4}$ atm. Various atmospheres that may be used for infiltration are discussed in greater detail below and illustrated in FIGS. 13-16. After infiltration, the part may be cooled, for example, cooling to 1700° F. over about 20-30 minutes and then cooling more slowly to room temperature in one embodiment. Depending on the nature of the materials involved, particularly the substrate material, post processing such as machining and/or heat treatment may be performed. For example, depending on the identity of the substrate, heat treatments such as normalizing, hardening followed by tempering, or martempering followed by tempering may be performed according to known techniques. It is understood that some substrates would not benefit from some (or any) heat treatments. Machining may or may not be desired, based on the intended application of the resultant part.

The infiltration of the filler material as described above is mainly driven by capillary action, i.e. capillary pressure acting on the infiltration front. The pressure differential at the infiltration front depends on many factors, including surface tension of the molten matrix material, contact angle of the molten matrix material with respect to the filler material, geometric characteristics of the filler material (e.g. porosity, tortuosity, variation in pore size and shape, and its effect on the apparent contact angle of the molten material), and the pressure of any residual gas within the filler material. The freedom to control many of these factors may be limited within a specific matrix/filler system. Residual gas pressure can be at least partially controlled, and minimization of residual gas pressure within the filler material can maximize the pressure differential and the driving force for capillary action. This, in turn, can maximize the potential distance that the matrix material can infiltrate the filler material. In at least some configurations, the use of filler material in the form of a preform or preforms may maximize the infiltration distance as compared to other forms of filler material.

FIGS. 13-16 illustrate systems or assemblies for forming a wear resistant composite material, where different atmospheres are used during the brazing operation to control and/or minimize the residual gas pressure in the filler material 15. In these embodiments, the infiltration is performed in a furnace 30 with a chamber 31 holding the mold 12, the matrix material 16, and the filler material 15, where the atmosphere inside the chamber 31 can be controlled. It is understood that the assembly may further include a substrate (not shown) that is in communication with the mold 12 as described below. The atmosphere in the brazing operation can be controlled to assist in achieving a capillary pressure gradient that is sufficient to drive infiltration of the matrix material over larger/longer distances through the filler material, such as distances of about 5-7 inches or greater. In each of the embodiments described below and shown in FIGS. 13-16, the chamber 31 is substantially evacuated prior to melting of the matrix material 16. Evacuation at least in the beginning of the infiltration process is preferred in one embodiment, in order to avoid oxidation of filler material. Different procedures may be used in other embodiments, however, such as not evacuating or evacuating to a lesser degree than discussed above.

Figure 13:
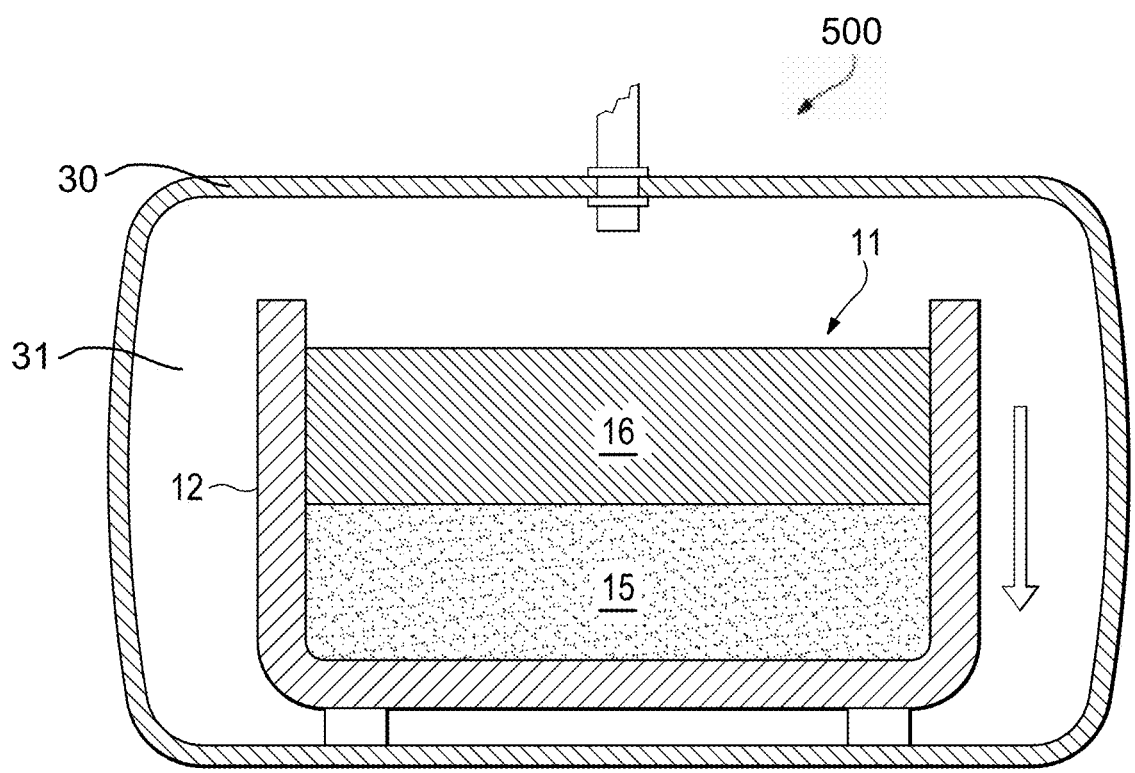
FIG. 13 is a schematic illustration showing an example of a system and method for infiltration of a porous wear resistant material with a braze material in a furnace under vacuum conditions, according to another embodiment of the present invention.

FIG. 13 illustrates one embodiment of a system 500 for infiltration, where the infiltration is performed under vacuum conditions. In this embodiment, the entire chamber 31 is evacuated prior to melting of the matrix material 16 and is maintained under vacuum conditions throughout the infiltration process. In one embodiment, the gas pressure after evacuation may be from 0.001 to 0.010 Torr, or may be as low as 0.0001 Torr in another embodiment (e.g. 0.0001 to 0.010 Torr), or may be below 0.0001 Torr in a further embodiment. Infiltration may be performed at approximately 2180-2225° F. for about 30-60 minutes in one embodiment. The evacuation of the chamber prior to melting of the matrix material 16 reduces or eliminates residual gas pressure in the filler material 15, which assists in driving infiltration through capillary action. It is noted that splattering due to volatilization of chemicals within the matrix material may be encountered as a result of maintaining the system under vacuum after the matrix material has been melted when certain alloys are used, particularly alloys with significant manganese content. Such splattering can not only damage equipment in the furnace 30, but can also reduce the amount of matrix material 16 available for brazing. This splattering can be mitigated by keeping the Mn content of the alloy sufficiently low, although doing so can be expensive. This splattering can also be avoided by the presence of Ar or another non-reactive gas in the chamber 31 after the matrix material 16 has been melted.

Figure 14:
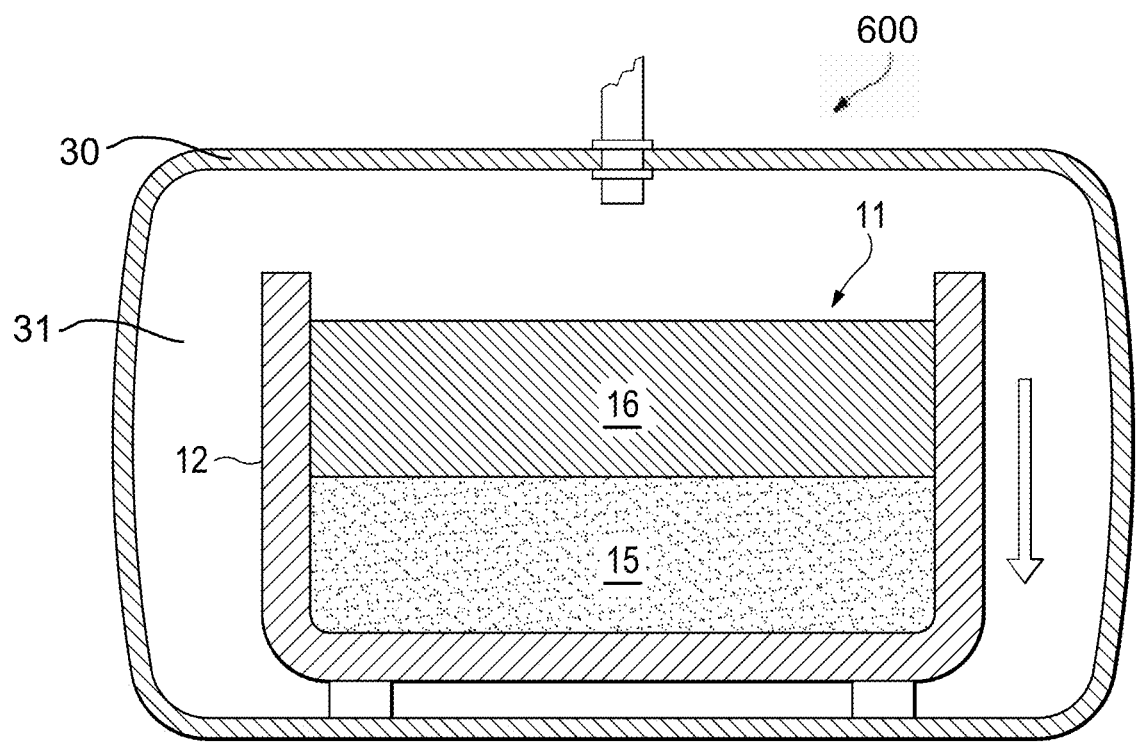
FIG. 14 is a schematic illustration showing an example of a system and method for infiltration of a porous wear resistant material with a braze material in a furnace under vacuum conditions prior to melting of the braze material, according to one embodiment of the present invention.
Figure 15:
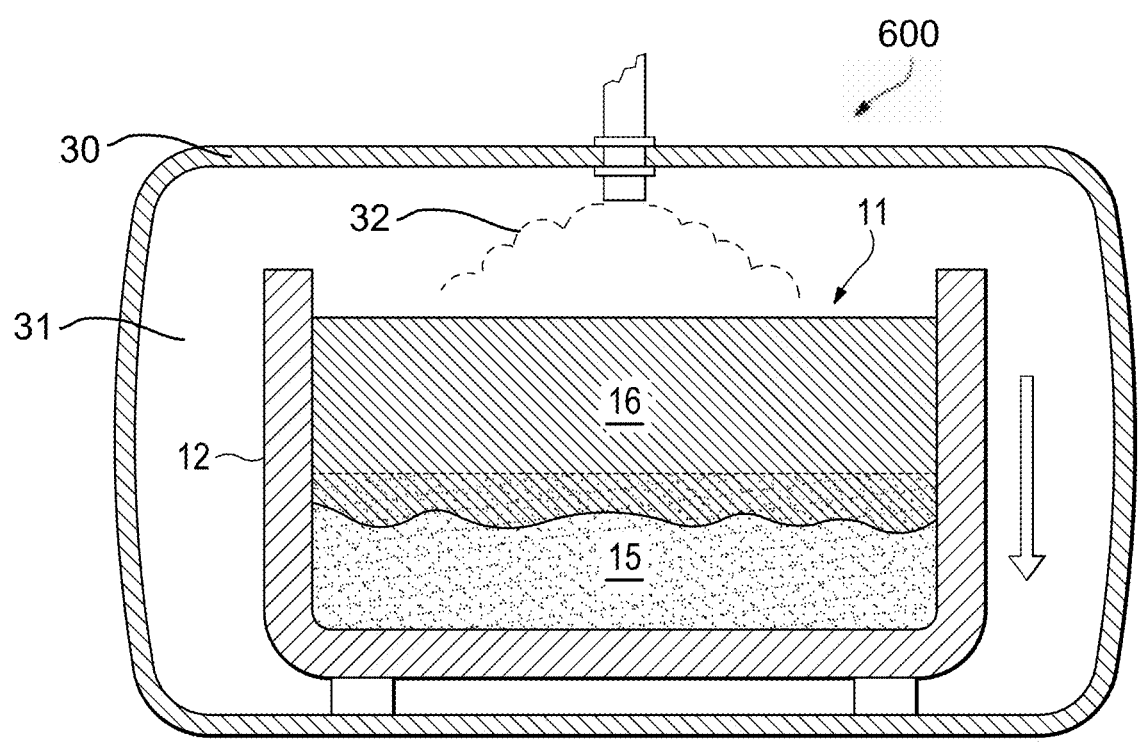
FIG. 15 is a schematic illustration of the system and method of FIG. 14, with partial Ar pressure introduced into the furnace after melting of the braze material.

FIGS. 14-15 illustrate another embodiment of a system 600 for infiltration, where Ar gas is introduced into the chamber 31 after the matrix material 16 is melted. As shown in FIG. 14, the chamber 31 is evacuated as described above prior to the brazing process, as similarly described above with respect to FIG. 13. As described above, infiltration may be performed at approximately 2180-2225° F. for about 30-60 minutes in one embodiment. After the matrix material 16 has melted, argon gas 32 (or another non-reactive gas) is introduced into the chamber 31. In one embodiment, the Ar gas 32 is fed into the chamber 31 until the Ar partial pressure reaches about 0.050-0.100 Torr. The evacuation of the chamber prior to melting of the matrix material 16 reduces or eliminates residual gas pressure in the filler material 15, which assists in driving infiltration as described above, and the later introduction of the Ar gas 32 assists in reducing splattering caused by volatile substances. In one example using a system as shown in FIGS. 14-15, the matrix material 16 was found to infiltrate at least 7.5 inches of filler material 15 during infiltration at 2180° F., when the Ar atmosphere was introduced after melting of the matrix material 16. However when the Ar atmosphere was introduced prior to melting, the matrix material 16 was found to infiltrate only 6.5 inches at most, regardless of how long the system was held at the infiltration temperature. This indicates that residual gas within the filler material 15 may limit the length of infiltration that can be achieved through capillary action.

FIG. 16 illustrates another embodiment of a system 700 for infiltration, where Ar gas 32 is introduced into the chamber 31 prior to melting of the matrix material 16. As similarly described above with respect to FIG. 14, the chamber 31 in this embodiment is evacuated as described above during the heating process until the system nearly reaches the melting temperature of the matrix material 16 (e.g. until the temperature reaches about 2150° F. for ductile iron). At that point, Ar gas 32 or other non-reactive gas is introduced into the chamber 31 prior to melting of the matrix material 16. As similarly described above, the gas 32 may be introduced until a partial Ar pressure of 0.050-0.100 Torr is reached, in one embodiment. As described above, infiltration may be performed at approximately 2180-2225° F. for about 30-60 minutes in one embodiment. In order to avoid residual gas pressure in the filler material 15 limiting infiltration, the mold 12 is provided with a permeable portion 33 in contact with the filler material 15. The permeable portion 33 may be porous or otherwise gas-permeable, to permit residual gas to escape from the filler material 15 during infiltration, so as not to limit infiltration of the matrix material 16. The permeable portion 33 may be provided generally opposite the matrix material 16 to avoid the matrix material 16 covering or sealing the permeable portion 33 to prevent escape of residual gas prior to completion of infiltration. As described above, the presence of the Ar gas suppresses splattering of the molten matrix material 16. In one example using a system as shown in FIG. 16, with the mold 12 including the permeable portion 33, the matrix material 16 was found to infiltrate at least 7.5 inches of filler material 15 during infiltration at 2225° F., when the Ar atmosphere was introduced before melting of the matrix material 16. However when the mold 12 was sealed and the infiltration front was not in communication with the atmosphere in the chamber 31 after melting of the matrix material 16, infiltration was found to extend only 6.5 inches at most. This indicates that keeping the infiltration front in communication with the atmosphere in the chamber 31 can reduce the limiting effect that residual gas within the filler material 15 may have on the capillary action driving force.

Figure 4:
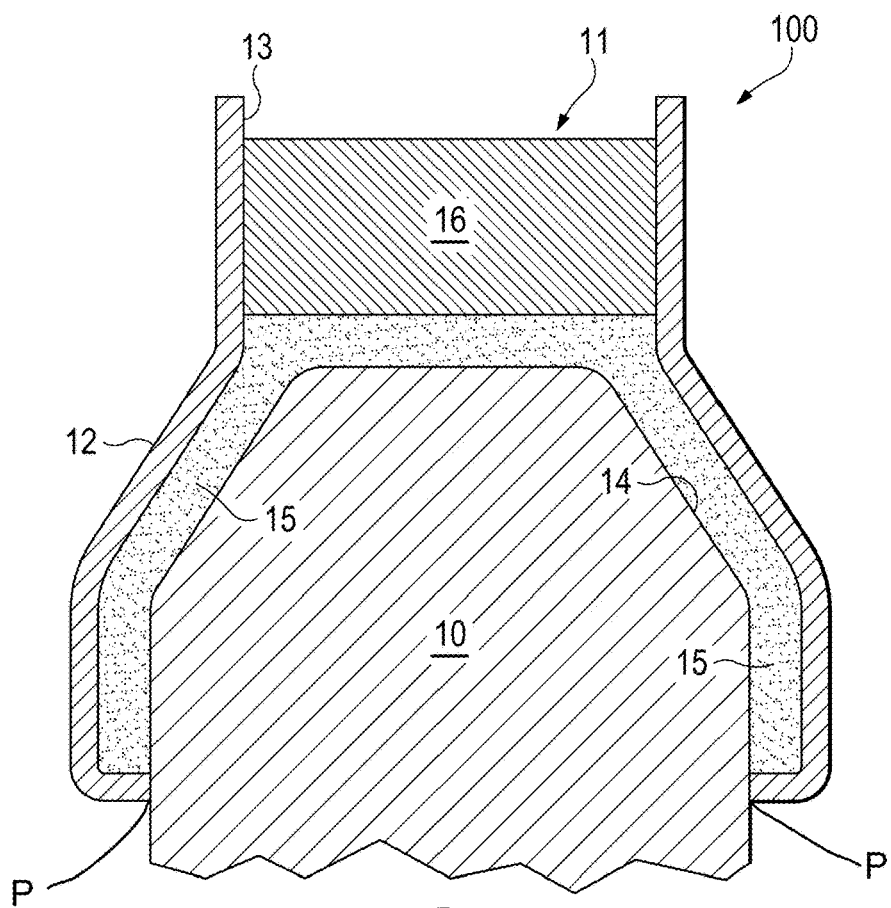
FIG. 4 is a schematic illustration showing one embodiment of a system and method of forming a wear resistant composite material on a substrate using vertical infiltration, prior to infiltration, according to aspects of the present invention.
Figure 5:
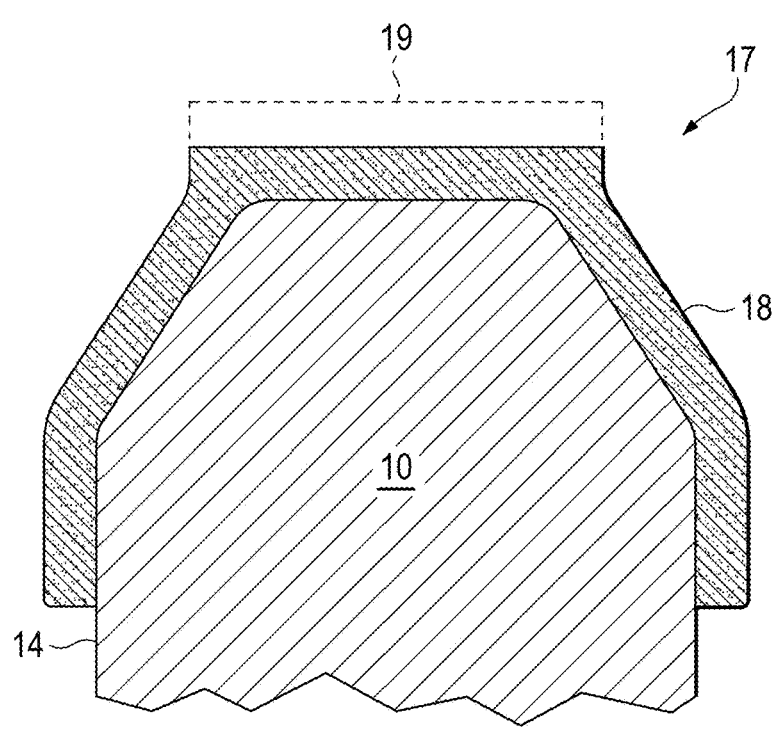
FIG. 5 is a schematic illustration showing the substrate having the wear resistant composite material formed thereon using the method as shown in FIG. 4, after infiltration, according to aspects of the present invention.

FIGS. 4-5 illustrate one example embodiment of a system or assembly 100 for forming a wear resistant composite material, and a method utilizing the system or assembly 100. In this embodiment, the substrate 10 (e.g. a point of an excavating tool) is positioned with a cavity 11 of a mold 12, such that the mold 12 entraps a volume in the cavity 11 between the inner surface 13 of the mold 12 and the outer surface 14 of the substrate 10, as shown in FIG. 4. The substrate 10 may be prepared beforehand, such as by cleaning and drying to remove oil or greasy substances and/or grit blasting using garnet grit to remove oxide scales and make the surface grainy so the matrix material bonds well to the substrate 10. The mold 12 may be made from any suitable material, such as a high-melting point metallic material, a ceramic material, or graphite. If possible, the mold 12 may be welded, brazed, or otherwise connected to the outer surface 14 of the substrate 10, such as by welding at points P. In one embodiment, the mold 12 is a steel shell that is welded to the substrate to create the cavity 11, and may be grit blasted prior to welding in order to avoid contamination of the mold cavity 11. Such an embodiment is described in greater detail below and shown in FIGS. 19-20. The filler material 15 is inserted into the mold cavity 11 in contact or otherwise in communication with the outer surface 14 of the substrate 10, such as in the form of a particulate material or a preform, as shown in FIG. 4. The matrix material 16 is placed in communication with the filler material 15 and the outer surface 14 of the substrate. The matrix material 16 may be positioned within the mold cavity 11, such as by simply placing the matrix material 16 on top of the filler material 15 in solid form, as shown in FIG. 4. In one embodiment, the matrix material 16 may be in block or billet form. In another embodiment, the matrix material 16 may be positioned in a feeder or injection structure. The system 100 may then be prepared for infiltration, as described above, such as by placing the system 100 in a furnace for heating, which may include an inert atmosphere (e.g. argon). A tray or similar vessel may be used to support the system 100 in the furnace, such as a stainless steel tray. During infiltration, the matrix material 16 melts and infiltrates downward through all of the filler material 15, eventually contacting the outer surface 14 of the substrate 10.

Figure 12:
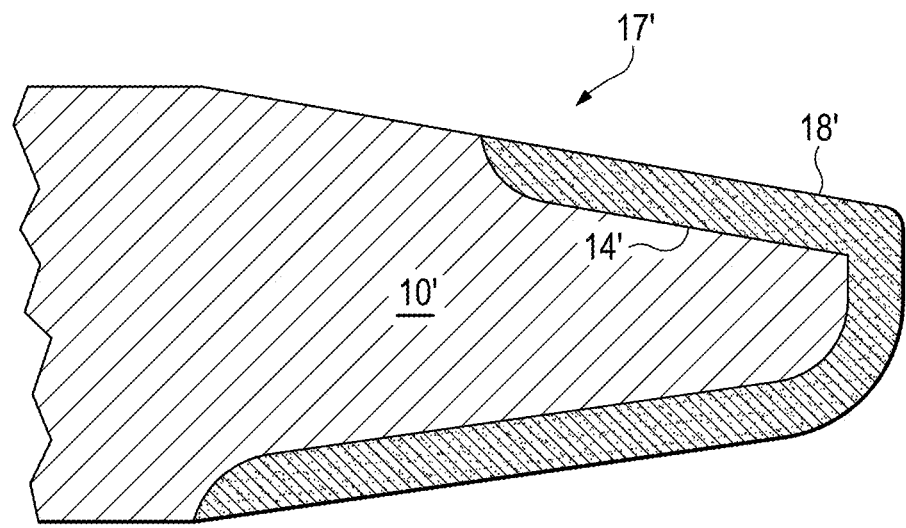
FIG. 12 is a schematic illustration showing another embodiment of a substrate having the wear resistant composite material formed thereon using an infiltration method, according to aspects of the present invention.

After infiltration has been conducted and the system 100 cooled as described above, a part 17 having a composite coating 18 on the outer surface 14 is formed, as shown in FIG. 5. The part 17 may be removed from the mold 12, which may require cutting or breaking the mold 12 away if welded to the substrate 10 and/or bonded to the coating 18. The composite coating 18 contains the filler material 15 bound together and connected to the substrate 10 by the matrix material 16. In one embodiment, the filler material 16 may have a volume fraction of 5-95% in the composite material 18. In another embodiment, the filler material 16 may have a volume fraction of 30-85%. In some embodiments, the part 17 may have excess matrix material 19 on at least a portion of the outside of the composite coating 18. The excess material 19 may be intentionally created and left on the part 17, such as to serve as a base for welding or attaching another piece. The excess material 19, if present, may instead be removed, such as by machining. The composite coating 18 may be formed with wide range of thicknesses, depending on the desired application. In one embodiment, a part 17 may be formed with a composite coating 18 that is about 0.5" thick, which may be usable in a wide variety of applications. The part 17 may be a point, edge, or other portion of a piece of equipment that sustains repeated impacts and stress, and the excellent wear resistance and toughness of the composite coating 18 enhances performance in such applications. Excavating/mining equipment represents one example of an application for a part 17 produced according to the systems and methods described herein. FIG. 12 illustrates an additional embodiment of a part 17' produced according to one embodiment of the system and method described herein, in the form of a wear member for earthmoving equipment (e.g., a steel mining point) with a working portion forming the substrate 10' overlaid on its outer surface 14' with a wear resistant composite material layer 18' as described above. In one embodiment, the composite material layer 18' consists of spherical cast tungsten carbide particles or other wear resistant material in a ductile iron matrix material.

FIGS. 17-18 illustrate another embodiment of a substrate 10 (e.g. a point of an excavating or mining tool) that may be used in connection with the system or assembly 100 as shown in FIGS. 4-5, or a similar system/assembly, for producing a wear resistant composite coating 18. Depending on the identity and nature of the material of the substrate 10, the filler material 15, and/or the matrix material 16, the coefficients of thermal expansion (CTE) of the substrate 10 and the coating 18 may be mismatched. For example, when a steel substrate 10 is used, the steel typically has a higher CTE than the coating 18. One example of such a CTE difference may be about $2 \times 10^{-6}$/° C., depending on materials used. This, in turn, can cause debonding between the substrate 10 and the coating 18, particularly when the coating 18 is formed on the outside surface of the substrate 10 (e.g. as shown in FIGS. 4-5). In the embodiment of FIGS. 17-18, the substrate 10 is provided with protrusions 28 in the form of ribs on the outer surface 14. The protrusions 28 can assist in mitigating the problems caused by differences in CTE between the substrate 10 and the coating 18 by plastically deforming in response to the pressures exerted as the substrate 10 and the coating 18 cool after brazing. In one embodiment, the protrusions 28 may be formed of a material with a relatively low yield strength and good ductility in order to ease plastic deformation. Other considerations in selecting the material for the protrusions 28 are its compatibility for connection to the substrate 10 (e.g. by welding or other technique) and for bonding to the coating 18. One example of material suitable for use as protrusions bonded to a steel substrate 10 is mild steel, such as AISI 1008. Other examples of suitable materials may include 304 stainless steel, AISI 1018, and AISI 1010, among others. The protrusions 28 also provide additional surfaces for bonding of the coating 18, and may therefore further enhance bonding between the coating 18 and the substrate 10. As seen in FIG. 18, the coating 18 forms around the protrusions 28 such that the protrusions 28 are embedded within the coating 18 and bonded to the coating 18 in the finished part 17. However in other embodiments, the protrusions 28 may extend at least to the outer surface of the coating 18 and may be substantially flush with the outer surface of the coating 18.

The protrusions 28 in the embodiment of FIGS. 17-18 extend outwardly from the outer surface 14 of the substrate 10 and are in the form of ribs or plates having a length and height significantly greater than their thickness. In one example, the protrusions 28 may have a length of about 1-2 inches (parallel to the surface of the substrate 10), a height of about 0.25 inches (parallel to the thickness direction of the coating 18), and a thickness of about 0.125 inches. Additionally, the protrusions 28 in this embodiment are oriented in a generally axial manner and distributed fairly evenly and symmetrically on all facets of the outer surface 14 of the substrate 10. In one embodiment, the protrusions 28 may have a thickness, length, and width selected in such a way that some or all of the strain resulting from thermal expansion mismatch is accommodated by deformation of the protrusions 28. Additionally, in one embodiment, the length of each protrusion may be greater than the height, which may in turn be greater than the thickness (i.e., length>width>thickness). Protrusions 28 using this dimensional relationship increase potential bonding area for the coating 18, as the potential bonding area added by the protrusion 28 is greater than the potential bonding area of the substrate 10 covered by the protrusion 28. The dimensions of the protrusions 28 may be modified depending on the thickness of the coating and dimensions of the substrate. The distance between the protrusions 28 may also depend on the location and geometry of the substrate 10, and can vary from 1" to 3" in one embodiment. In other embodiments, the protrusions 28 may have a different form, such as rods, cones, pegs, etc., and may be distributed and/or oriented in a different manner. The protrusions 28 as shown in FIG. 17 are welded to the outer surface 14 of the substrate 10. The substrate 10 may be grit blasted after welding. Other techniques for connecting the protrusions 28 to the substrate 10 may be used in other embodiments. It is understood that, the protrusions 28 may be formed of the same material as the substrate 10, and may be integrally formed with the substrate 10 in one embodiment. It is also understood that the substrate 10 having the protrusions 28 may require a heat treatment or modified versions of traditional heat treatments after welding and/or after brazing, depending on the materials and structures used. Further, the finished part 17 as shown in FIGS. 17-18 is a wear member, such as a point for earthmoving equipment, and the substrate 10 is formed by a working portion of the wear member, such that the protrusions 28 are connected to the working portion. It is understood that other types of protrusions 28 may be utilized with such a wear member, and also that protrusions 28 as shown in FIGS. 17-18 may be utilized with other types of articles of manufacture.

FIGS. 6-9 illustrate other systems and methods for creating a wear resistant composite according to aspects of the invention. FIGS. 6-7 illustrate a system 200 for forming a composite material on an inner surface 20 of a substrate 10 through outward or radial infiltration. In this embodiment, the substrate 10 is tubular in form, and the substrate 10 is used along with a mold 12 and a plate 21 to create a mold cavity 11 on the inside of the substrate 10. The plate 21 may be formed of any suitable material, including any material mentioned above for mold construction (e.g. graphite, metal, or ceramic). If the plate 21, the mold 12, and/or the substrate 10 are made of weldable materials, any of these components may be connected by welding, however welding is not necessary. The porous filler material 15 is positioned on the inner surface 20 of the substrate 10 in position to form the composite, and the matrix material 16 is placed in contact or otherwise in communication with the filler material 15. Ceramic beads 22 or another displacement material are also placed in the mold cavity 11, in position to displace the matrix material 16 during infiltration. It is understood that the displacement of the matrix material 16 is done in order to support the matrix material 16 in constant contact with the filler material 15 during infiltration, and that the infiltration of the matrix material 16 is primarily driven by other forces (e.g. capillary action), rather than force exerted by the ceramic beads 22. Alternately, another displacement technique may be used. In the embodiment in FIGS. 6-7, the matrix material 16 may be placed in the mold cavity 11 in tubular form (see FIG. 7), in contact with the filler material 15, and infiltrates outwardly into the filler material 15. The matrix material 16 may instead be provided as a plurality of billets arranged in a circular formation around the filler material 15 in another embodiment. In this configuration, ceramic beads 22 are placed inside the inner diameter of the tubular matrix material 16, and the beads 22 move outwardly to displace the infiltrated matrix material 16. Alternately, another displacement technique may be used. The system 200 can be placed in a furnace and processed as described above to complete infiltration. The resulting part has a ceramic material on the inner surface 21 of the substrate, and may include excess matrix material, as described above.

Figure 8:
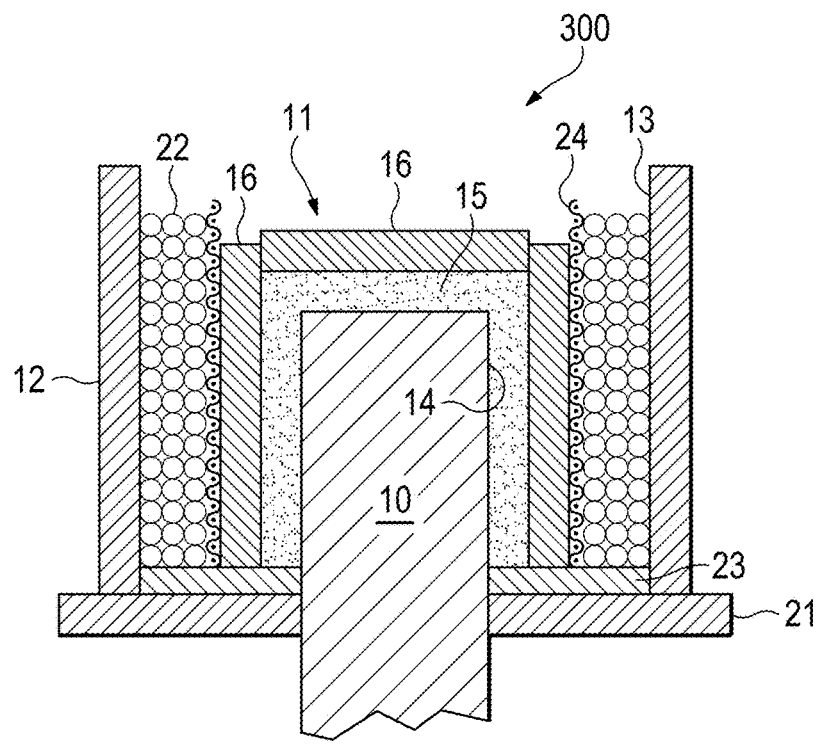
FIG. 8 is a schematic illustration showing another embodiment of a system and method of forming a wear resistant composite material on a substrate using vertical and horizontal infiltration, prior to infiltration, according to aspects of the present invention.

FIG. 8 illustrates a system 300 for forming a composite material on an outer surface 14 of a substrate 10 through both horizontal and downward vertical infiltration. In this embodiment, a portion of the substrate 10 is placed inside the mold cavity 11, and a plate 21 is used with the mold 12 to enclose the mold cavity 11. The plate 21 may be formed of any suitable material, including any material mentioned above for mold construction (e.g. graphite, metal, or ceramic). If the plate 21, the mold 12, and/or the substrate 10 are made of weldable materials, any of these components may be connected by welding, however welding is not necessary. An additional member 23 may be used for sealing purposes and/or for terminating infiltration, and may be positioned adjacent the plate 21. Graphite foil or ceramic wool may be used as the additional member 23 to accomplish these functions, as the matrix material 15 does not wet or penetrate these materials. The porous filler material 15 is positioned on the outer surface 14 of the substrate 10 in position to form the composite, and the matrix material 16 is placed in contact or otherwise in communication with the filler material 15. As shown in FIG. 8, the matrix material 16 is placed above the filler material 15 for downward infiltration and alongside the filler material 15 for horizontal infiltration. Ceramic beads 22 or another displacement material are also placed in the mold cavity 11, in position to displace the matrix material 16 during infiltration. Alternately, another displacement technique may be used. In the embodiment in FIG. 8, the matrix material 16 is placed in the mold cavity 11 around the filler material 15, and infiltrates horizontally and vertically into the filler material 15. In this configuration, the ceramic beads 22 are placed horizontally around the matrix material 16, and the beads 22 move inwardly to displace the horizontally infiltrated matrix material 16. A barrier 24, such as a flexible ceramic fiber mat or a woven fabric, may be placed between the beads 22 and the matrix material 16. The barrier 24 may generally be impermeable to the molten matrix material 16, and may also be flexible and may transmit pressure from the ceramic beads 22 onto the matrix material 15. No displacement of the vertically infiltrated matrix material 16 is necessary. The system 300 can be placed in a furnace and processed as described above to complete infiltration. The resulting part has a ceramic material on the outer surface 14 of the substrate, and may include excess matrix material, as described above.

Figure 9:
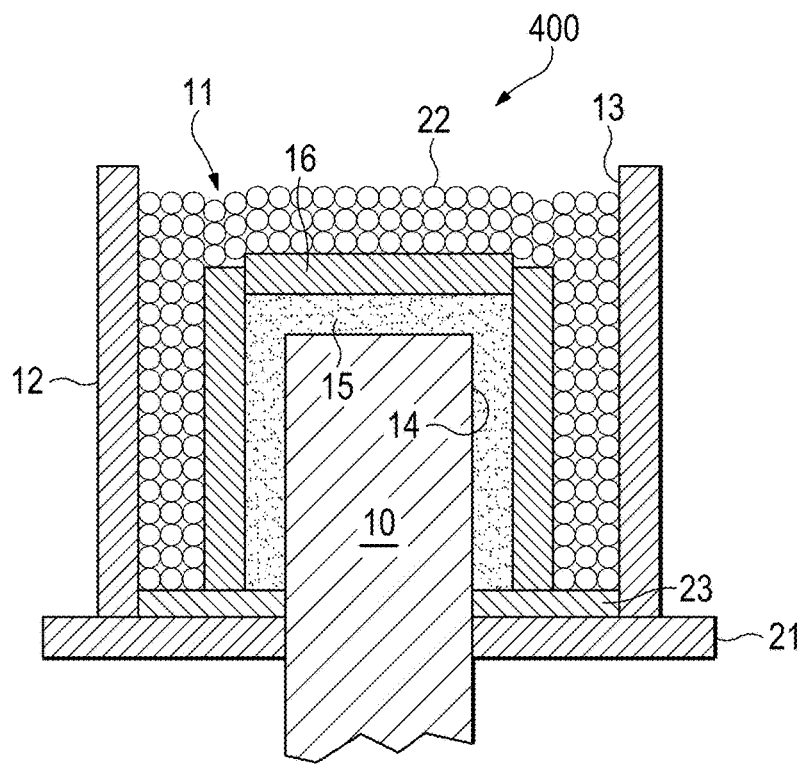
FIG. 9 is a schematic illustration showing another embodiment of a system and method of forming a wear resistant composite material on a substrate using vertical and horizontal infiltration, prior to infiltration, according to aspects of the present invention.

FIG. 9 illustrates a system 400 for forming a composite material on an outer surface 14 of a substrate 10 through both horizontal and downward vertical infiltration. In this embodiment, a portion of the substrate 10 is placed inside the mold cavity 11, and a plate 21 is used with the mold 12 to enclose the mold cavity 11. The plate 21 may be formed of any suitable material, including any material mentioned above for mold construction (e.g. graphite, metal, or ceramic). If the plate 21, the mold 12, and/or the substrate 10 are made of weldable materials, any of these components may be connected by welding, however welding is not necessary. An additional member 23 may be used for sealing purposes and/or for terminating infiltration, and may be positioned adjacent the plate 21. Graphite foil or ceramic wool may be used as the additional member 23 to accomplish these functions, as the matrix material 15 does not wet or penetrate these materials. The porous filler material 15 is positioned on the outer surface 14 of the substrate 10 in position to form the composite, and the matrix material 16 is placed in contact or otherwise in communication with the filler material 15. As shown in FIG. 9, the matrix material 16 is placed above the filler material 15 for downward infiltration and alongside the filler material 15 for horizontal infiltration. Ceramic beads 22 or another displacement medium are also placed in the mold cavity 11, in position to displace the matrix material 16 during infiltration. Alternately, another displacement technique may be used. In the embodiment in FIG. 9, the matrix material 16 is placed in the mold cavity 11 around the filler material 15, and infiltrates horizontally and vertically into the filler material 15. In this configuration, the ceramic beads 22 are placed horizontally and vertically around the matrix material 16, and the beads 22 move inwardly and downwardly to displace the infiltrating matrix material 16. The system 400 can be placed in a furnace and processed as described above to complete infiltration. The resulting part has a ceramic material on the outer surface 14 of the substrate, and may include excess matrix material, as described above.

Figure 19:
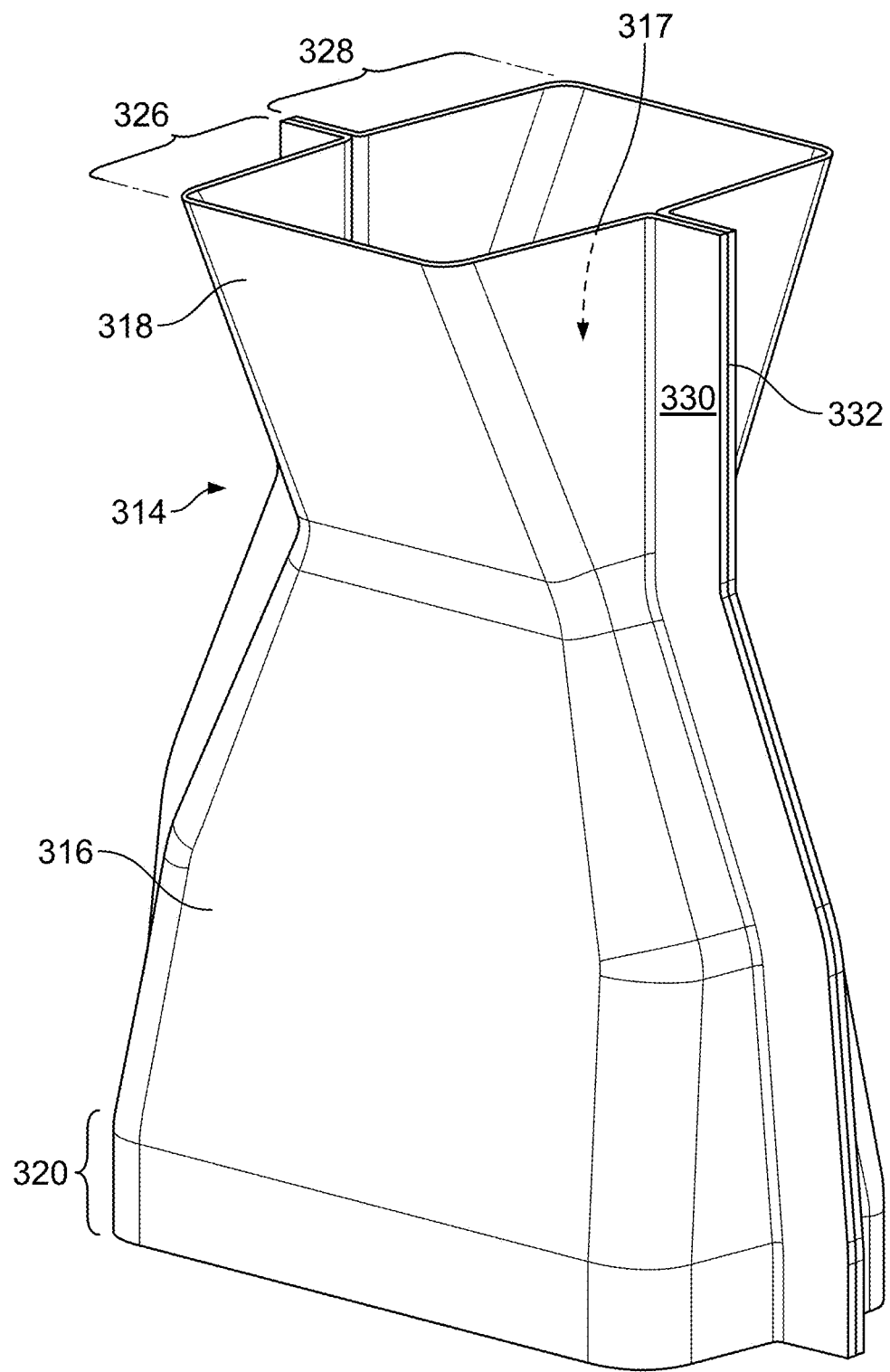
FIG. 19 is a perspective view of one embodiment of a shell configured for use as a mold for forming a wear resistant composite material according to aspects of the present invention.
Figure 20:
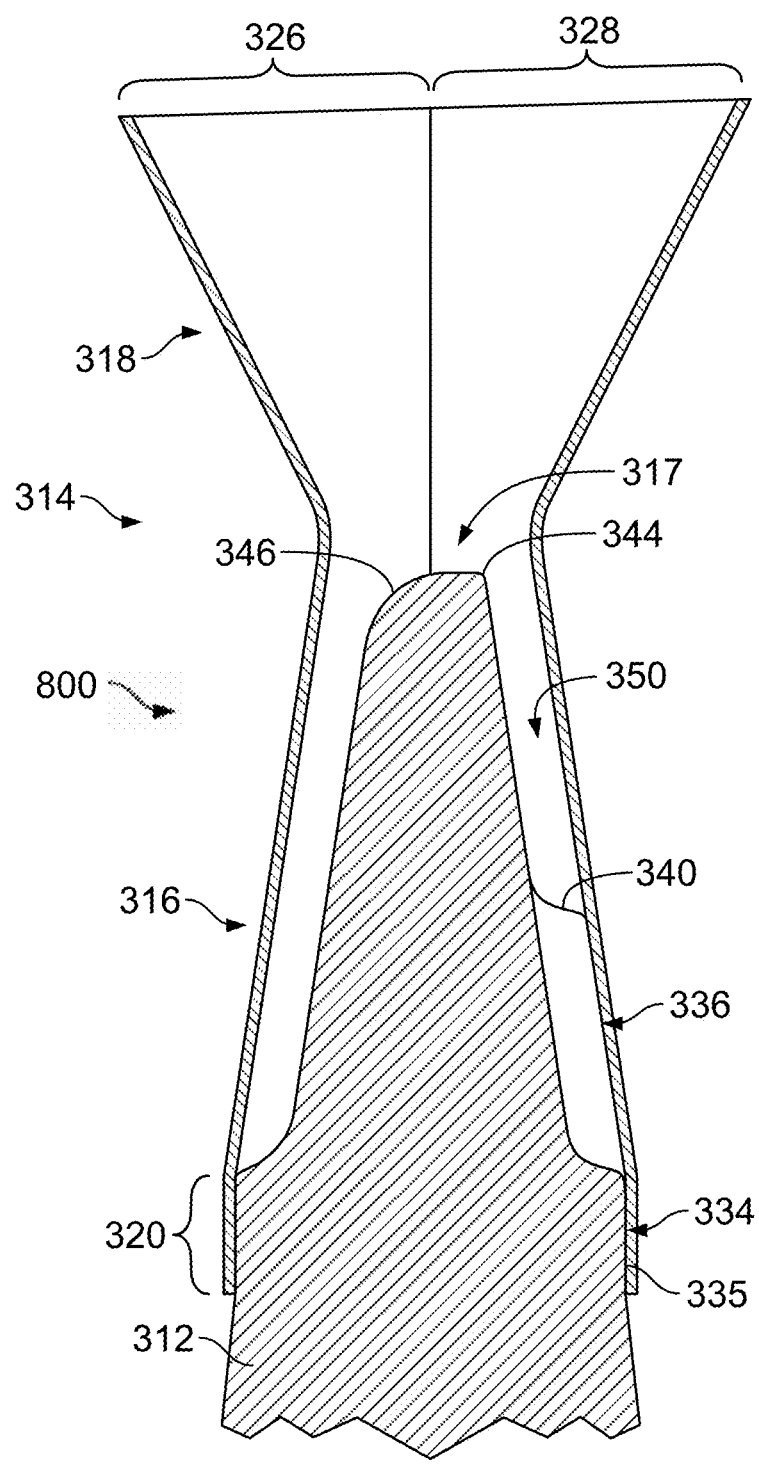
FIG. 20 is a cross-sectional view of the shell of FIG. 19 connected to one embodiment of a substrate in the form of a point for excavating or mining equipment, configured for use in forming a wear resistant composite material according to aspects of the present invention.

FIGS. 19-20 illustrate another example of a system 800 for forming a composite material on an outer surface 14 of a substrate 10 mainly through downward vertical infiltration. The system 800 of FIGS. 19-20 utilizes a mold in the form of a shell 314 made from a sheet material, which is shown being used in conjunction with a substrate 312 in the form of an excavating/mining point that may be similar to the substrates 10, 10' as shown in FIGS. 4-5 and 12. The shell 314 shown in FIGS. 19-20, along with other such shells, are described in greater detail in U.S. Provisional Application No. 61/472,470, filed Apr. 6, 2011, and U.S. patent application Ser. No. 13/440,273, filed Apr. 5, 2012, and published as U.S. Patent Application Publication No. 2012/0258273 on Oct. 11, 2012, which applications are incorporated by reference herein in their entireties and made parts hereof. The shell 314 may be utilized to form a composite coating 18 as similarly described above and shown in FIGS. 4-5. In one embodiment, the filler material 15 may be poured through the opening 317 in the shell 314, and the matrix material 16 may thereafter be placed on top of the filler material 15, as similarly shown in FIG. 4. The opening 317 may have a funnel-like configuration to aid insertion of the filler material 15 and/or the matrix material 16. In other embodiments, the opening 317 may be located elsewhere on the shell 314, such as if the shell 314 is positioned in a different orientation during brazing.

The sheet metal of the shell 314 may be made of any material capable of being formed or fabricated to a particular desired shape and capable of withstanding dissolution, melting, or undue weakening by the infiltrating material, or generally by the temperatures required for infiltration brazing, during the infiltrating process. In one example, the shell 314 may be formed of low-carbon "mild" steel. For example, shell 314 may have an average shell thickness of approximately 0.105 in. In one embodiment, the shell 314 may be made of sheet metal in the range of 16 Ga (0.060 in. thick) to 10 Ga (0.135 in. thick), which may be useful for a wide range of applications. In contrast, the substrate 312 in FIG. 20 may have a thickness ranging from 1.000 to 3.450 inches in the region covered by the shell. In other embodiments, the shell 314 may have any other suitable thickness. For example, in further embodiments, the shell 314 may be made of a steel or other metallic plate having a thickness of approximately 0.25 inches, or may be cast, machined from bar stock, or formed in a different manner. It is understood that different portions of the shell 314 may have different thicknesses.

The relative thinness of the shell 314 when compared to the substrate 312 means that the shell 314 may be formed easily, relatively inexpensively. For simple shapes of a shell, a relatively low-cost shell 314 may be made by cutting pieces of sheet metal, and welding or brazing those pieces together. Slightly more complicated shapes may be made by bending pieces of sheet metal in particular configurations, and then welding the bent sheet metal pieces together. Complex shapes can be made by sheet metal forming processes such as deep drawing, forming by the Guerin process (rubber pad forming), hydroforming, and/or explosive forming. Precision ('lost wax') casting could be used as well, although the cost of the lost wax process would often be uneconomical. For particularly complicated shapes, pieces of the shell could be formed by one or more of these processes, and then joined by welding or brazing.

As shown in FIGS. 19-20, the shell 314 is formed of two parts, having a two-part conformal band 320. A two-part shell body 316 of shell 314 may be initially formed from a front half piece 326 and a back half piece 328, having a front flange 330 or a rear flange 332, respectively. Front flange 330 extends transversely from the back edge of the front half 326 and rear flange 332 extends transversely from the front edge of the back half 328. Front flange 330 may be joined to rear flange 332 by welding or brazing with a brazing material having a higher melting temperature than the material intended for infiltration. The shell 314 may have a conformal band 320 configured to be placed in surface-to-surface contact with a portion of the surface of the substrate 312 around an entire periphery of the shell 314, such that the shell 314 is connected to the substrate 312 by welding or brazing at least at the conformal band 320, as described below. In other embodiments, the shell 314 may be formed of a single piece (in which flanges 330, 332 may not be present) or a larger number of pieces. The two-part shell 314 may be more easily formed than a corresponding one-part shell, in certain configurations. The two-part shell 314 may also be more easily joined to a corresponding substrate, in certain configurations, when compared to such joining with a corresponding one-part shell.

The shell 314 is shown joined to a portion of a corresponding substrate 312 in the form of a point, in FIG. 20. An outer geometry for substrate 312 may include a primary body 334 that defines a bonding surface 335 for welding or brazing to the conformal band 320. The substrate 312 may provide at least some recess or other relief for the bonding of the hard material, such as a plateau 336 and the surrounding surfaces. A distal end of the substrate 312 may be shaped to define an angular edge 344, and/or a rounded face 346. In another embodiment, the substrate 312 may not provide any recess or other relief for the hard material. As seen in FIG. 20, the shell 314 extends smoothly away from the conformal band 320, defining a cavity 350 between substrate 312 and shell 314. The cavity 350 defines a resulting thickness of the coating (not shown) bonded to substrate 312, and the inner geometry of the shell 314 defines an ultimate outer geometry of a finished part.

The light sheet metal shell 314 as shown in FIGS. 19-20 may be readily moved for precise alignment on a substrate, and then welded to the substrate, regardless of most orientations of the substrate. The thin metal shell is easy to attach reliably to the underlying substrate by welding or high temperature brazing, without the need for clamping or fixtures, and the joint created is fluid-tight even at the high temperatures required for infiltration brazing. In any type of infiltration hardfacing involving molds, the molten metal brazing material should remain inside the mold. With the thin metal shells of the present disclosure, reliable attachment to a substrate is achieved without extra clamping or fixtures. The resulting assembly is therefore more easily placed in a furnace for infiltration brazing, allowing substantially greater ease of infiltration hardfacing heavy items.

It is understood that various features of the systems 100, 200, 300, 400, 500, 600, 700, 800 described above and shown in the figures, as well as variations thereof, may be combined and interchanged within the scope of the present invention. Likewise, any of the techniques of the methods described above, or variations thereof, may be utilized in connection with any of the systems 100, 200, 300, 400, 500, 600, 700, 800 described above.

Figure 10:
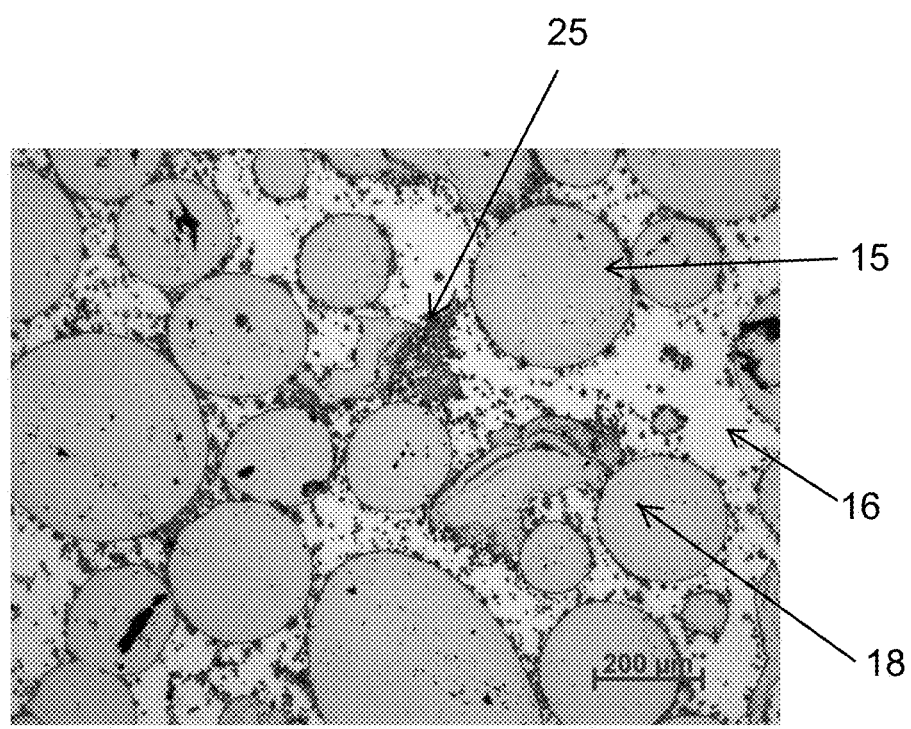
FIG. 10 is a photomicrograph illustrating an example of spherical cast tungsten carbide particles in a ductile iron matrix, produced using a method according to the present invention.
Figure 11:
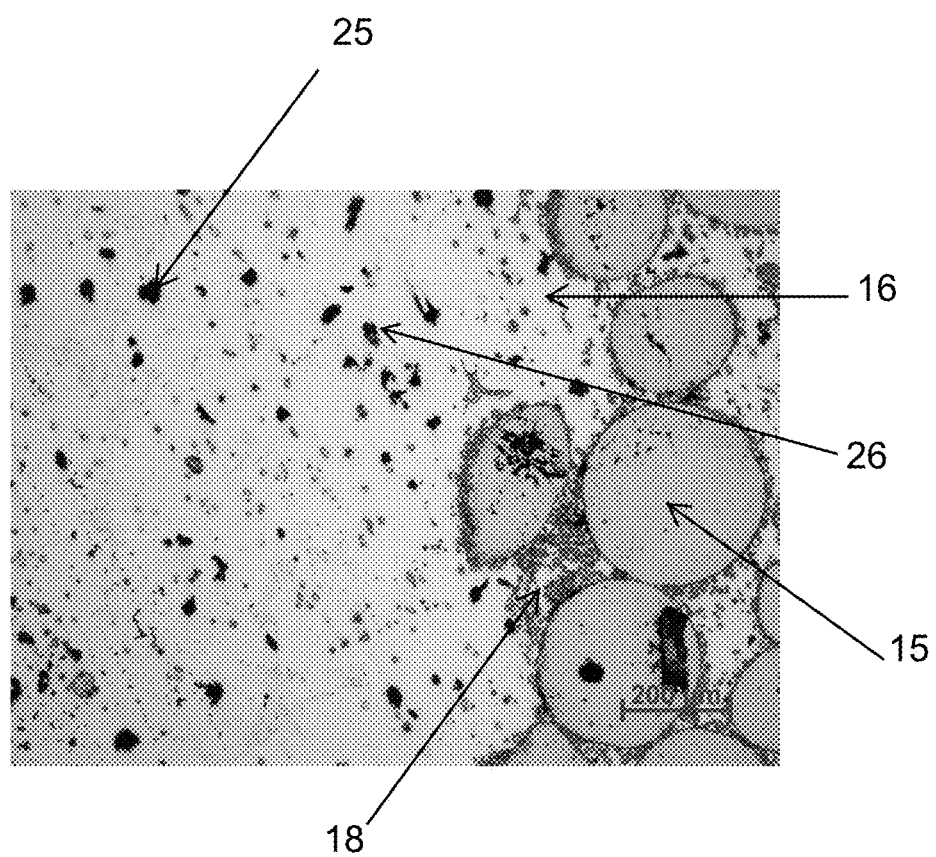
FIG. 11 is a photomicrograph illustrating an interface between a spherical cast tungsten carbide/ductile iron composite and excess ductile iron remaining after the infiltration process using a method according to the present invention.

FIGS. 10-11 illustrate photomicrographs of a composite material 18 formed using a system similar to the system 100 of FIG. 4 and using a method as described above. FIGS. 10-11 illustrate the spherical cast WC filler material 15 surrounded by a ductile iron matrix material 16. The matrix material 16 includes graphite nodules 25, which is characteristic of ductile iron. As seen in FIGS. 10-11 the spherical shapes of most of the WC particles 15 have been preserved, indicating minimal reaction or dissolution of the filler material 15 with the molten matrix material 16. FIG. 11 illustrates the interface 26 between the composite material 18 and the excess matrix material 19.

Composite coatings produced according to the systems and methods described herein exhibit excellent wear resistance and toughness. In one example, samples were prepared using a system similar to the system 100 of FIG. 4 and using a method as described above, using spherical cast WC, crushed cast WC, and cemented WC with a ductile iron matrix. Samples of cast and cemented WC reinforced with nickel based alloys and copper by vacuum infiltration at 2050° F. were prepared for comparison. D2 steel was also used for comparison. Dry sand rubber wheel (DSRW) abrasion tests (ASTM G65) were conducted on these samples, pursuant to Procedure A of ASTM G65. The test conditions were as follows:

Total revolutions: 6000
Load on the sample: 30 lbs
Sand flow rate: 300-400 g/min.

Two consecutive DSRW tests were done on the same wear scar region and the mass loss during the second test was taken as representative of abrasive wear loss of material. As it can be seen from Table 1 below, spherical cast tungsten carbide/ductile iron followed by crushed cast tungsten carbide/ductile iron showed excellent abrasion resistance compared to other materials. The samples were prepared as coatings, and the substrate was removed by machining and grinding in order to expose the surface close to the substrate for testing.

TABLE 1

Dry sand rubber wheel (DSRW) test data on different materials

| Sl. No | Carbide material | Mass loss, g | Calculated density, g/cc | Volume loss, mm$^3$ | Rockwell Hardness, HRC |
|---|---|---|---|---|---|
| 1 | Spherical cast WC/DI | 0.03 | 12.18 | 2.46 | 50 |
| 2 | Crushed cast WC/DI | 0.06 | 12.18 | 4.93 | 45 |

TABLE 1-continued

Dry sand rubber wheel (DSRW) test data on different materials

| Sl. No | Carbide material | Mass loss, g | Calculated density, g/cc | Volume loss, mm³ | Rockwell Hardness, HRC |
|---|---|---|---|---|---|
| 3 | Cemented carbide/DI | 0.19 | 10.95 | 17.35 | 57 |
| 4 | Spherical cast WC/ Ni—7Cr—3Fe—4.5Si—3.1B | 0.19 | 12.58 | 15.10 | 55 |
| 5 | Cemented carbide/ Ni—7Cr—3Fe—4.5Si—3.1B | 0.10 | 11.37 | 8.79 | 51 |
| 6 | Crushed cast WC/ Ni—7Cr—3Fe—4.5Si—3.1B | 0.14 | 12.58 | 11.13 | 50 |
| 7 | Crushed cast WC/Cu | 0.08 | 13.02 | 6.14 | 5 |
| 8 | Cemented carbide/Cu | 0.37 | 11.83 | 31.28 | 9 |
| 9 | D2 tool steel | 0.25 | 7.8 | 32.05 | 60 |

As seen from the results in Table 1 above, the use of ductile iron in combination with spherical cast WC and crushed cast WC resulted in lower mass and volume loss as compared to other combinations. Additionally, the combinations of WC and ductile iron had hardnesses that were comparable to other combinations. Further, ductile iron is considerably less expensive than the other matrix alloys tested, particularly Ni and Cu alloys. Accordingly, this testing illustrates the advantageous use of a composite made from a ductile iron matrix material and WC filler material using systems and methods according to embodiments of the present invention.

The various embodiments of the system, method, and product described herein provide benefits and advantages over existing technology. For example, the resultant composite product exhibits excellent wear resistance and toughness, and can be produced economically. As another example, the system and method can be used to apply a wear resistant material to a large variety of different substrates, including wrought, cast, and powder metallurgy metallic substrates, as well as non-metallic substrates such as ceramics or ceramic-based composites, as long as the melting point of the material is suitable for the infiltration process. As another example, the use of brazing techniques allows for the material formation and bonding to the substrate to be accomplished in a single step. Additionally, the brazing techniques typically utilize a longer time for infiltration as compared to casting and other techniques, which in turn allows for longer infiltration lengths (up to 8-10" or greater in some embodiments). Accordingly, thicker coatings can also be produced as compared to existing techniques, including casting, as well as other hardfacing processes such as plasma transferred arc weld overlay, thermal spray, etc. As another example, the system and method may utilize lower superheating than other processes (e.g. casting), which results in less reaction between the filler material and the matrix material and sound microstructures that exhibit high wear resistance and toughness. In addition, the lower degree of reaction permits smaller particle sizes, or multiple particle sizes, to be used for the filler material, by which greater density of the hard filler material can be achieved. As described above, greater yield strength of the matrix material and greater overall wear resistance of the composite material can also be achieved. As another example, the use of an inert atmosphere in the system and method minimizes or prevents oxidation of the components and can control the evaporation of volatile elements from the matrix material, reducing splashing. Still other benefits and advantages are recognized by those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Relative terms such as "top," "bottom," etc., as used herein, are intended for illustrative purposes only and do not limit the embodiments in any way. Nothing in this specification should be construed as requiring a specific three dimensional orientation of structures in order to fall within the scope of this invention, unless specifically recited in the claims. Also, the reader is advised that the attached drawings are not necessarily drawn to scale. Additionally, the term "plurality," as used herein, indicates any number greater than one, either disjunctively or conjunctively, as necessary, up to an infinite number. Further, "Providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention and the scope of protection is only limited by the scope of the accompanying Claims.

What is claimed is:

1. A point for an excavating tooth having a working portion to contact the ground during operation of the earth-moving equipment, the working portion including a steel substrate having oppositely-facing surfaces extending to a distal end, a cavity formed in each of the oppositely-facing surfaces extending rearward from the distal end, a composite coating filling each of the cavities to overlay those portions of the oppositely-facing surfaces and the distal end that are within each of the cavities, and a shell secured to the substrate rearward of each of the cavities to define an outer shape of the composite coating, the composite coating comprising a porous wear resistant material infiltrated by a matrix material wherein the matrix material is principally ductile iron and bonds the composite coating to the working portion and the shell.

2. The point of claim 1, wherein the matrix material has a composition comprising, in weight percent, approximately 3.0-4.0% carbon, approximately 1.8-2.8% silicon, approximately 0.1-1.0% manganese, approximately 0.01-0.03% sulfur, and approximately 0.01-0.1% phosphorous, with the balance being iron and incidental elements and impurities.

3. The point of claim 2, wherein the composition of the matrix material further comprises up to 37 wt. % nickel.

4. The point of claim 2, wherein the composition of the matrix material further comprises up to 5.5 wt. % chromium.

5. The point of claim 1, wherein the composition of the matrix material further comprises up to 5.5 wt. % silicon.

6. The point of claim 1, wherein the porous wear resistant material is a particulate material, and the matrix material bonds the wear resistant material together.

7. The point of claim 1, wherein the wear resistant material comprises one or more materials selected from the group consisting of: carbides, nitrides, borides, silicides, intermetallic compounds of transition metals, and combinations thereof.

8. The point of claim 1, wherein the steel substrate has a plurality of protrusions connected to the working portion and extending outwardly from the working portion, and wherein the protrusions are embedded within the composite coating.

9. The point of claim 8, wherein the plurality of protrusions comprise a plurality of rib members symmetrically distributed on the working portion.

10. The point of claim 1, wherein the composite coating has a thickness that is greater than a thickness of the substrate.

11. The point of claim 1, wherein the composite coating has a thickness of at least 7.5 inches.

12. The point of claim 1, wherein the shell has a conformal band in contact with the working portion rearward of the cavities.

13. The point of claim 12, wherein the shell is connected to the steel substrate by welding or brazing rearward of the cavities.

14. The point of claim 1 where the wear resistant material within the cavity is primarily particles less than 1 mm in size.

\* \* \* \* \*